(12) United States Patent
Jin et al.

(10) Patent No.: US 8,093,839 B2
(45) Date of Patent: Jan. 10, 2012

(54) METHOD AND APPARATUS FOR DRIVING CCFL AT LOW BURST DUTY CYCLE RATES

(75) Inventors: Xiaoping Jin, Orange, CA (US); Simon Mark Kahn, Jerusalem (IL)

(73) Assignee: Microsemi Corporation, Garden Grove, CA (US)

( * ) Notice: Subject to any disclaimer, the term of this patent is extended or adjusted under 35 U.S.C. 154(b) by 299 days.

(21) Appl. No.: 12/610,327

(22) Filed: Nov. 1, 2009

(65) Prior Publication Data

US 2010/0123400 A1  May 20, 2010

Related U.S. Application Data

(60) Provisional application No. 61/116,302, filed on Nov. 20, 2008.

(51) Int. Cl.
*H05B 37/02* (2006.01)
(52) U.S. Cl. .................. 315/308; 315/246; 315/DIG. 4
(58) Field of Classification Search .......... 315/246, 315/250, 254, 276, 291, 307, 308, DIG. 2, 315/DIG. 4, DIG. 5, DIG. 7
See application file for complete search history.

(56) References Cited

U.S. PATENT DOCUMENTS

| | | |
|---|---|---|
| 2,429,162 A | 10/1947 | Russell et al. |
| 2,440,984 A | 5/1948 | Summers |
| 2,572,258 A | 10/1951 | Goldfield et al. |
| 2,965,799 A | 12/1960 | Brooks et al. |
| 2,968,028 A | 1/1961 | Eilichi et al. |
| 3,141,112 A | 7/1964 | Eppert |
| 3,449,629 A | 6/1969 | Wigert et al. |
| 3,565,806 A | 2/1971 | Ross |
| 3,597,656 A | 8/1971 | Douglas |
| 3,611,021 A | 10/1971 | Wallace |
| 3,683,923 A | 8/1972 | Anderson |
| 3,737,755 A | 6/1973 | Calkin et al. |
| 3,742,330 A | 6/1973 | Hodges et al. |
| 3,916,283 A | 10/1975 | Burrows |

(Continued)

FOREIGN PATENT DOCUMENTS

EP 0326114 8/1989

(Continued)

OTHER PUBLICATIONS

Bradley, D.A., "Power Electronics" 2nd Edition; Chapman & Hall, 1995; Chapter 1, pp. 1-38.

(Continued)

*Primary Examiner* — Thuy Vinh Tran
(74) *Attorney, Agent, or Firm* — Simon Kahn

(57) ABSTRACT

A cold cathode fluorescent lamp controller constituted of a pulse generator exhibiting a cycle period; a burst dimming control operative to set a burst dimming duty cycle for the pulse generator; a comparator arranged to receive a signal indicative of the value of current through a load driven by the pulse generator and compare the received signal to a reference signal; an error detection circuit operative to shut down the pulse generator responsive to an output of the comparator indicating that the received signal is less than the reference signal for a predetermined number of cycles of the pulse generator; and a disable circuit arranged to prevent, when the set burst dimming duty cycle is less than a predetermined value, the shut down of the pulse generator responsive to the output of the comparator indicating the received signal is less than the reference signal.

20 Claims, 8 Drawing Sheets

U.S. PATENT DOCUMENTS

| | | |
|---|---|---|
| 3,936,696 A | 2/1976 | Gray |
| 3,944,888 A | 3/1976 | Clark |
| 4,053,813 A | 10/1977 | Komrumpf et al. |
| 4,060,751 A | 11/1977 | Anderson |
| 4,194,147 A | 3/1980 | Payne et al. |
| 4,204,141 A | 5/1980 | Nuver |
| 4,257,090 A | 3/1981 | Kröger et al. |
| 4,276,590 A | 6/1981 | Hansel et al. |
| 4,277,728 A | 7/1981 | Stevens |
| 4,307,441 A | 12/1981 | Bello |
| 4,353,009 A | 10/1982 | Knoll |
| 4,359,679 A | 11/1982 | Regan |
| 4,386,394 A | 5/1983 | Kocher et al. |
| 4,388,562 A | 6/1983 | Josephson |
| 4,392,087 A | 7/1983 | Zansky |
| 4,425,613 A | 1/1984 | Shelly |
| 4,437,042 A | 3/1984 | Morais et al. |
| 4,441,054 A | 4/1984 | Bay |
| 4,463,287 A | 7/1984 | Pitel |
| 4,469,988 A | 9/1984 | Cronin |
| 4,480,201 A | 10/1984 | Jaeschke |
| 4,523,130 A | 6/1985 | Pitel |
| 4,543,522 A | 9/1985 | Moreau |
| 4,544,863 A | 10/1985 | Hashimoto |
| 4,555,673 A | 11/1985 | Huijsing et al. |
| 4,562,338 A | 12/1985 | Okami |
| 4,567,379 A | 1/1986 | Corey et al. |
| 4,572,992 A | 2/1986 | Masaki |
| 4,574,222 A | 3/1986 | Anderson |
| 4,585,974 A | 4/1986 | Stupp et al. |
| 4,618,779 A | 10/1986 | Wiscombe |
| 4,622,496 A | 11/1986 | Dattilo et al. |
| 4,626,770 A | 12/1986 | Price, Jr. |
| 4,630,005 A | 12/1986 | Clegg et al. |
| 4,635,178 A | 1/1987 | Greenhalgh |
| 4,663,566 A | 5/1987 | Nagano |
| 4,663,570 A | 5/1987 | Luchaco et al. |
| 4,672,300 A | 6/1987 | Harper |
| 4,675,574 A | 6/1987 | Delflache |
| 4,682,080 A | 7/1987 | Ogawa et al. |
| 4,686,615 A | 8/1987 | Ferguson |
| 4,689,802 A | 8/1987 | McCambridge |
| 4,698,554 A | 10/1987 | Stupp et al. |
| 4,698,738 A | 10/1987 | Miller et al. |
| 4,700,113 A | 10/1987 | Stupp et al. |
| 4,717,833 A | 1/1988 | Small |
| 4,717,863 A | 1/1988 | Zeiler |
| 4,724,374 A | 2/1988 | Beg |
| 4,729,086 A | 3/1988 | Lethellier |
| 4,734,844 A | 3/1988 | Rhoads |
| 4,745,339 A | 5/1988 | Izawa et al. |
| 4,761,722 A | 8/1988 | Pruitt |
| 4,766,353 A | 8/1988 | Burgess |
| 4,779,037 A | 10/1988 | LoCascio |
| 4,780,696 A | 10/1988 | Jirka |
| 4,792,747 A | 12/1988 | Schroeder |
| 4,812,781 A | 3/1989 | Regnier |
| 4,825,144 A | 4/1989 | Alberkrack et al. |
| 4,847,745 A | 7/1989 | Shekhawat |
| 4,862,059 A | 8/1989 | Tominaga et al. |
| 4,885,486 A | 12/1989 | Shekhawat et al. |
| 4,893,069 A | 1/1990 | Harada et al. |
| 4,902,942 A | 2/1990 | El-Hamamsy et al. |
| 4,924,170 A | 5/1990 | Henze |
| 4,939,381 A | 7/1990 | Shibata |
| 4,998,046 A | 3/1991 | Lester |
| 5,023,519 A | 6/1991 | Jensen |
| 5,030,887 A | 7/1991 | Guisinger |
| 5,036,255 A | 7/1991 | Rector |
| 5,036,452 A | 7/1991 | Loftus |
| 5,049,790 A | 9/1991 | Herfurth et al. |
| 5,057,719 A | 10/1991 | Niedra |
| 5,057,808 A | 10/1991 | Dhyanchand |
| 5,077,486 A | 12/1991 | Marson et al. |
| 5,083,065 A | 1/1992 | Sakata et al. |
| 5,089,748 A | 2/1992 | Ihms |
| 5,105,127 A | 4/1992 | Lavaud et al. |
| 5,130,565 A | 7/1992 | Girmay |
| 5,130,635 A | 7/1992 | Kase |
| 5,157,269 A | 10/1992 | Jordan et al. |
| 5,164,890 A | 11/1992 | Nakagawa et al. |
| 5,173,643 A | 12/1992 | Sullivan et al. |
| 5,200,643 A | 4/1993 | Brown |
| 5,220,272 A | 6/1993 | Nelson |
| 5,235,254 A | 8/1993 | Ho |
| 5,266,838 A | 11/1993 | Gerner |
| 5,285,148 A | 2/1994 | Uhlenhoff et al. |
| 5,289,051 A | 2/1994 | Zitta |
| 5,317,401 A | 5/1994 | Dupont et al. |
| 5,327,028 A | 7/1994 | Yum et al. |
| 5,349,272 A | 9/1994 | Rector |
| 5,351,180 A | 9/1994 | Brennen et al. |
| 5,406,305 A | 4/1995 | Shimomura et al. |
| 5,410,221 A | 4/1995 | Mattas et al. |
| 5,420,779 A | 5/1995 | Payne |
| 5,428,523 A | 6/1995 | McDonnal |
| 5,430,641 A | 7/1995 | Kates |
| 5,434,477 A | 7/1995 | Crouse et al. |
| 5,440,208 A | 8/1995 | Uskali et al. |
| 5,463,287 A | 10/1995 | Kurihara et al. |
| 5,471,130 A | 11/1995 | Agiman |
| 5,475,284 A | 12/1995 | Lester et al. |
| 5,475,285 A | 12/1995 | Konopka |
| 5,479,337 A | 12/1995 | Voigt |
| 5,485,057 A | 1/1996 | Smallwood et al. |
| 5,485,059 A | 1/1996 | Yamashita et al. |
| 5,485,487 A | 1/1996 | Orbach et al. |
| 5,493,183 A | 2/1996 | Kimball |
| 5,495,405 A | 2/1996 | Fujimura et al. |
| 5,510,974 A | 4/1996 | Gu et al. |
| 5,514,947 A | 5/1996 | Berg |
| 5,519,289 A | 5/1996 | Katyl et al. |
| 5,528,192 A | 6/1996 | Agiman |
| 5,539,281 A | 7/1996 | Shackle et al. |
| 5,546,298 A | 8/1996 | Rohner |
| 5,546,299 A | 8/1996 | Lenz |
| 5,548,189 A | 8/1996 | Williams |
| 5,552,697 A | 9/1996 | Chan |
| 5,557,249 A | 9/1996 | Reynal |
| 5,563,473 A | 10/1996 | Mattas et al. |
| 5,563,501 A | 10/1996 | Chan |
| 5,568,044 A | 10/1996 | Bittner |
| 5,574,335 A | 11/1996 | Sun |
| 5,574,356 A | 11/1996 | Parker |
| 5,602,464 A | 2/1997 | Linkowsky et al. |
| 5,608,312 A | 3/1997 | Wallace |
| 5,612,594 A | 3/1997 | Maheshwari |
| 5,612,595 A | 3/1997 | Maheshwari |
| 5,615,093 A | 3/1997 | Nalbant |
| 5,619,104 A | 4/1997 | Eunghwa |
| 5,619,402 A | 4/1997 | Liu |
| 5,621,281 A | 4/1997 | Kawabata et al. |
| 5,629,588 A | 5/1997 | Oda et al. |
| 5,635,799 A | 6/1997 | Hesterman |
| 5,652,479 A | 7/1997 | LoCascio et al. |
| 5,663,613 A | 9/1997 | Yamashita et al. |
| 5,705,877 A | 1/1998 | Shimada |
| 5,710,489 A | 1/1998 | Nilssen |
| 5,712,533 A | 1/1998 | Corti |
| 5,712,776 A | 1/1998 | Palara et al. |
| 5,719,474 A | 2/1998 | Vitello |
| 5,724,237 A | 3/1998 | Hunter |
| 5,744,915 A | 4/1998 | Nilssen |
| 5,748,460 A | 5/1998 | Ishikawa |
| 5,751,115 A | 5/1998 | Jayaraman et al. |
| 5,751,120 A | 5/1998 | Zeitler et al. |
| 5,751,150 A | 5/1998 | Rippel et al. |
| 5,751,560 A | 5/1998 | Yokoyama |
| 5,754,012 A | 5/1998 | LoCascio |
| 5,754,013 A | 5/1998 | Praiswater |
| 5,760,760 A | 6/1998 | Helms |
| 5,770,925 A | 6/1998 | Konopka et al. |
| 5,777,439 A | 7/1998 | Hua |
| 5,786,801 A | 7/1998 | Ichise |
| 5,796,213 A | 8/1998 | Kawasaki |
| 5,808,422 A | 9/1998 | Venkitasubrahmanian et al. |
| 5,818,172 A | 10/1998 | Lee |

| | | | | | | |
|---|---|---|---|---|---|---|
| 5,822,201 | A | 10/1998 | Kijima | 6,281,638 B1 | 8/2001 | Moisin |
| 5,825,133 | A | 10/1998 | Conway | 6,285,571 B1 | 9/2001 | Brooks et al. |
| 5,828,156 | A | 10/1998 | Roberts | 6,291,946 B1 | 9/2001 | Hinman |
| 5,834,925 | A | 11/1998 | Chesavage | 6,292,378 B1 | 9/2001 | Brooks et al. |
| 5,844,540 | A | 12/1998 | Terasaki | 6,294,883 B1 | 9/2001 | Weindorf |
| 5,854,617 | A | 12/1998 | Lee et al. | 6,307,356 B1 | 10/2001 | Dwelley |
| 5,859,489 | A | 1/1999 | Shimada | 6,307,765 B1 | 10/2001 | Choi |
| 5,872,429 | A | 2/1999 | Xia et al. | 6,310,444 B1 | 10/2001 | Chang |
| 5,875,104 | A | 2/1999 | Prager | 6,313,586 B1 | 11/2001 | Yamamoto et al. |
| 5,880,946 | A | 3/1999 | Biegel | 6,316,881 B1 | 11/2001 | Shannon et al. |
| 5,883,473 | A | 3/1999 | Li et al. | 6,316,887 B1 | 11/2001 | Ribarich et al. |
| 5,883,797 | A | 3/1999 | Amaro et al. | 6,317,347 B1 | 11/2001 | Weng |
| 5,886,477 | A | 3/1999 | Honbo et al. | 6,320,329 B1 | 11/2001 | Wacyk |
| 5,892,336 | A | 4/1999 | Lin et al. | 6,323,602 B1 | 11/2001 | De Groot et al. |
| 5,901,176 | A | 5/1999 | Lewison | 6,331,755 B1 | 12/2001 | Ribarich et al. |
| 5,903,138 | A | 5/1999 | Hwang et al. | 6,340,870 B1 | 1/2002 | Yamashita et al. |
| 5,910,709 | A | 6/1999 | Stevanovic et al. | 6,344,699 B1 | 2/2002 | Rimmer |
| 5,910,713 | A | 6/1999 | Nishi et al. | 6,346,798 B1 | 2/2002 | Passoni et al. |
| 5,912,812 | A | 6/1999 | Moriarty, Jr. et al. | 6,351,080 B1 | 2/2002 | Birk et al. |
| 5,914,842 | A | 6/1999 | Sievers | RE37,609 E | 3/2002 | Bittner |
| 5,923,129 | A | 7/1999 | Henry | 6,356,035 B1 | 3/2002 | Weng |
| 5,923,546 | A | 7/1999 | Shimada et al. | 6,359,393 B1 | 3/2002 | Brown |
| 5,925,988 | A | 7/1999 | Grave et al. | 6,362,577 B1 | 3/2002 | Ito et al. |
| 5,930,121 | A | 7/1999 | Henry | 6,362,608 B1 | 3/2002 | Ashburn et al. |
| 5,930,126 | A | 7/1999 | Griffin et al. | 6,388,388 B1 | 5/2002 | Weindorf et al. |
| 5,936,360 | A | 8/1999 | Kaneko | 6,396,217 B1 | 5/2002 | Weindorf |
| 5,939,830 | A | 8/1999 | Praiswater | 6,396,722 B2 | 5/2002 | Lin |
| 5,945,815 | A | 8/1999 | Elliott | 6,417,631 B1 | 7/2002 | Chen et al. |
| 5,973,368 | A | 10/1999 | Pearce et al. | 6,420,839 B1 | 7/2002 | Chiang et al. |
| 5,973,485 | A | 10/1999 | Kates et al. | 6,424,100 B1 | 7/2002 | Kominami et al. |
| 6,002,210 | A | 12/1999 | Nilssen | 6,429,839 B1 | 8/2002 | Sakamoto |
| 6,011,360 | A | 1/2000 | Gradzki et al. | 6,433,492 B1 | 8/2002 | Buonavita |
| 6,016,245 | A | 1/2000 | Ross | 6,441,943 B1 | 8/2002 | Roberts et al. |
| 6,020,688 | A | 2/2000 | Moisin | 6,445,141 B1 | 9/2002 | Kastner et al. |
| 6,028,400 | A | 2/2000 | Pol et al. | 6,452,344 B1 | 9/2002 | MacAdam et al. |
| 6,037,720 | A | 3/2000 | Wong et al. | 6,459,215 B1 | 10/2002 | Nerone et al. |
| 6,038,149 | A | 3/2000 | Hiraoka et al. | 6,459,216 B1 | 10/2002 | Tsai |
| 6,040,661 | A | 3/2000 | Bogdan | 6,469,922 B2 | 10/2002 | Choi |
| 6,040,662 | A | 3/2000 | Asayama | 6,472,827 B1 | 10/2002 | Nilssen |
| 6,043,609 | A | 3/2000 | George et al. | 6,472,876 B1 | 10/2002 | Notohamiprodjo et al. |
| 6,049,177 | A | 4/2000 | Felper | 6,479,810 B1 | 11/2002 | Weindorf |
| 6,069,448 | A | 5/2000 | Yeh | 6,483,245 B1 | 11/2002 | Weindorf |
| 6,072,282 | A | 6/2000 | Adamson | 6,486,618 B1 | 11/2002 | Li |
| 6,091,209 | A | 7/2000 | Hilgers | 6,494,587 B1 | 12/2002 | Shaw et al. |
| 6,104,146 | A | 8/2000 | Chou et al. | 6,495,972 B1 | 12/2002 | Okamoto et al. |
| 6,108,215 | A | 8/2000 | Kates et al. | 6,501,234 B2 | 12/2002 | Lin et al. |
| 6,111,370 | A | 8/2000 | Parra | 6,507,286 B2 | 1/2003 | Weindorf et al. |
| 6,114,814 | A | 9/2000 | Shannon et al. | 6,509,696 B2 | 1/2003 | Bruning et al. |
| 6,121,733 | A | 9/2000 | Nilssen | 6,515,427 B2 | 2/2003 | Oura et al. |
| 6,127,785 | A | 10/2000 | Williams | 6,515,881 B2 | 2/2003 | Chou et al. |
| 6,127,786 | A | 10/2000 | Moison | 6,521,879 B1 | 2/2003 | Rand et al. |
| 6,137,240 | A | 10/2000 | Bogdan | 6,522,558 B2 | 2/2003 | Henry |
| 6,144,194 | A | 11/2000 | Varga | 6,531,831 B2 | 3/2003 | Chou et al. |
| 6,150,772 | A | 11/2000 | Crane | 6,534,934 B1 | 3/2003 | Lin et al. |
| 6,157,143 | A | 12/2000 | Bigio et al. | 6,559,606 B1 | 5/2003 | Chou et al. |
| 6,160,362 | A | 12/2000 | Shone et al. | 6,563,479 B2 | 5/2003 | Weindorf et al. |
| 6,166,528 | A | 12/2000 | Rossetti et al. | 6,570,344 B2 | 5/2003 | Lin |
| 6,169,375 | B1 | 1/2001 | Moisin | 6,570,347 B2 | 5/2003 | Kastner |
| 6,172,468 | B1 | 1/2001 | Hollander | 6,583,587 B2 | 6/2003 | Ito et al. |
| 6,181,066 | B1 | 1/2001 | Adamson | 6,593,703 B2 | 7/2003 | Sun |
| 6,181,083 | B1 | 1/2001 | Moisin | 6,628,093 B2 | 9/2003 | Stevens |
| 6,181,084 | B1 | 1/2001 | Lau | 6,630,797 B2 | 10/2003 | Qian et al. |
| 6,188,183 | B1 | 2/2001 | Greenwood et al. | 6,633,138 B2 | 10/2003 | Shannon et al. |
| 6,188,553 | B1 | 2/2001 | Moisin | 6,642,674 B2 | 11/2003 | Liao et al. |
| 6,194,841 | B1 | 2/2001 | Takahashi et al. | 6,650,514 B2 | 11/2003 | Schmitt |
| 6,198,234 | B1 | 3/2001 | Henry | 6,654,268 B2 | 11/2003 | Choi |
| 6,198,236 | B1 | 3/2001 | O'Neill | 6,664,744 B2 | 12/2003 | Dietz |
| 6,211,625 | B1 | 4/2001 | Nilssen | 6,680,834 B2 | 1/2004 | Williams |
| 6,215,256 | B1 | 4/2001 | Ju | 6,703,998 B1 | 3/2004 | Kabel et al. |
| 6,218,788 | B1 | 4/2001 | Chen et al. | 6,707,264 B2 | 3/2004 | Lin et al. |
| 6,229,271 | B1 | 5/2001 | Liu | 6,710,555 B1 | 3/2004 | Terada et al. |
| 6,239,558 | B1 | 5/2001 | Fujimura et al. | 6,717,371 B2 | 4/2004 | Klier et al. |
| 6,252,355 | B1 | 6/2001 | Meldrum et al. | 6,717,372 B2 | 4/2004 | Lin et al. |
| 6,255,784 | B1 | 7/2001 | Weindorf | 6,717,375 B2 | 4/2004 | Noguchi et al. |
| 6,259,215 | B1 | 7/2001 | Roman | 6,724,602 B2 | 4/2004 | Giannopoulos |
| 6,259,615 | B1 | 7/2001 | Lin | 6,765,354 B2 | 7/2004 | Klien |
| 6,262,566 | B1 | 7/2001 | Dinh | 6,781,325 B2 | 8/2004 | Lee |
| 6,278,263 | B1 | 8/2001 | Walters et al. | 6,784,627 B2 | 8/2004 | Suzuki et al. |
| 6,281,636 | B1 | 8/2001 | Okutsu et al. | 6,803,901 B1 | 10/2004 | Numao |

| | | |
|---|---|---|
| 6,804,129 B2 | 10/2004 | Yung-Lin Lin |
| 6,809,718 B2 | 10/2004 | Wei et al. |
| 6,809,938 B2 | 10/2004 | Lin et al. |
| 6,815,906 B1 | 11/2004 | Aarons et al. |
| 6,816,142 B2 | 11/2004 | Oda et al. |
| 6,856,099 B2 | 2/2005 | Chen et al. |
| 6,856,519 B2 * | 2/2005 | Lin et al. .................... 363/16 |
| 6,864,867 B2 | 3/2005 | Biebl |
| 6,870,330 B2 | 3/2005 | Choi |
| 6,876,157 B2 | 4/2005 | Henry |
| 6,897,698 B1 | 5/2005 | Gheorghiu et al. |
| 6,900,599 B2 | 5/2005 | Ribarich |
| 6,900,600 B2 | 5/2005 | Rust et al. |
| 6,900,993 B2 * | 5/2005 | Lin et al. .................... 363/17 |
| 6,922,023 B2 | 7/2005 | Hsu et al. |
| 6,930,893 B2 | 8/2005 | Vinciarelli |
| 6,936,975 B2 | 8/2005 | Lin et al. |
| 6,947,024 B2 | 9/2005 | Lee et al. |
| 6,967,449 B2 | 11/2005 | Ishihara |
| 6,967,657 B2 | 11/2005 | Lowles et al. |
| 6,969,958 B2 | 11/2005 | Henry |
| 6,979,959 B2 | 12/2005 | Henry |
| 7,026,860 B1 | 4/2006 | Gheorghiu et al. |
| 7,057,611 B2 | 6/2006 | Lin et al. |
| 7,075,245 B2 | 7/2006 | Liu |
| 7,095,392 B2 | 8/2006 | Lin |
| 7,120,035 B2 * | 10/2006 | Lin et al. .................... 363/16 |
| 7,151,394 B2 | 12/2006 | Gheorghiu et al. |
| 7,183,724 B2 | 2/2007 | Ball |
| 7,187,140 B2 | 3/2007 | Ball |
| 7,190,123 B2 | 3/2007 | Lee |
| 7,202,458 B2 | 4/2007 | Park |
| 7,233,117 B2 | 6/2007 | Wang et al. |
| 7,236,020 B1 | 6/2007 | Virgil |
| 2001/0036096 A1 | 11/2001 | Lin |
| 2002/0030451 A1 | 3/2002 | Moisin |
| 2002/0097004 A1 | 7/2002 | Chiang et al. |
| 2002/0114114 A1 | 8/2002 | Schmitt |
| 2002/0118182 A1 | 8/2002 | Weindorf |
| 2002/0130786 A1 | 9/2002 | Weindorf |
| 2002/0135319 A1 | 9/2002 | Bruning et al. |
| 2002/0140538 A1 | 10/2002 | Yer |
| 2002/0145886 A1 | 10/2002 | Stevens |
| 2002/0153852 A1 | 10/2002 | Liao et al. |
| 2002/0171376 A1 | 11/2002 | Rust et al. |
| 2002/0180380 A1 | 12/2002 | Lin |
| 2002/0180572 A1 | 12/2002 | Kakehashi et al. |
| 2002/0181260 A1 | 12/2002 | Chou et al. |
| 2002/0195971 A1 | 12/2002 | Qian et al. |
| 2003/0001524 A1 | 1/2003 | Lin et al. |
| 2003/0020677 A1 | 1/2003 | Nakano |
| 2003/0025462 A1 | 2/2003 | Weindorf |
| 2003/0080695 A1 | 5/2003 | Ohsawa |
| 2003/0090913 A1 | 5/2003 | Che-Chen et al. |
| 2003/0117084 A1 | 6/2003 | Stack |
| 2003/0141829 A1 | 7/2003 | Yu |
| 2003/0161164 A1 | 8/2003 | Shannon et al. |
| 2003/0227435 A1 | 12/2003 | Hsieh |
| 2004/0000879 A1 | 1/2004 | Lee |
| 2004/0012556 A1 | 1/2004 | Yong et al. |
| 2004/0017348 A1 | 1/2004 | Numao |
| 2004/0032223 A1 | 2/2004 | Henry |
| 2004/0051473 A1 | 3/2004 | Jales et al. |
| 2004/0145558 A1 | 7/2004 | Cheng |
| 2004/0155596 A1 | 8/2004 | Ushijima |
| 2004/0155853 A1 | 8/2004 | Lin |
| 2004/0189217 A1 | 9/2004 | Ishihara et al. |
| 2004/0257003 A1 | 12/2004 | Hsieh et al. |
| 2004/0263092 A1 | 12/2004 | Liu |
| 2005/0062436 A1 | 3/2005 | Jin |
| 2005/0093471 A1 | 5/2005 | Jin |
| 2005/0093472 A1 | 5/2005 | Jin |
| 2005/0093482 A1 | 5/2005 | Ball |
| 2005/0093483 A1 | 5/2005 | Ball |
| 2005/0093484 A1 | 5/2005 | Ball |
| 2005/0099143 A1 | 5/2005 | Kohno |
| 2005/0156536 A1 | 7/2005 | Ball |
| 2005/0156539 A1 | 7/2005 | Ball |
| 2005/0156540 A1 | 7/2005 | Ball |
| 2005/0162098 A1 | 7/2005 | Ball |
| 2005/0218825 A1 | 10/2005 | Chiou |
| 2005/0225261 A1 | 10/2005 | Jin |
| 2006/0022612 A1 | 2/2006 | Henry |
| 2006/0049959 A1 | 3/2006 | Sanchez |
| 2006/0158136 A1 | 7/2006 | Chen |
| 2007/0040517 A1 * | 2/2007 | Yu ................. 315/291 |
| 2010/0039048 A1 * | 2/2010 | Liu et al. ................. 315/307 |

FOREIGN PATENT DOCUMENTS

| | | |
|---|---|---|
| EP | 0587923 | 3/1994 |
| EP | 0597661 | 5/1994 |
| EP | 0647021 | 9/1994 |
| JP | 06168791 | 6/1994 |
| JP | 8-204488 | 8/1996 |
| KR | 10-2003-0075461 | 10/2003 |
| TW | 554643 | 9/2003 |
| TW | 8-204488 | 12/2003 |
| TW | 200501829 | 1/2005 |
| WO | WO 94/15444 | 7/1994 |
| WO | WO 98/09369 | 3/1998 |
| WO | WO 9941953 | 8/1999 |
| WO | WO 0237904 | 5/2002 |

OTHER PUBLICATIONS

Coles, Single Stage CCFL Backlight Resonant Inverter using PWM Dimming Methods, 1998, pp. 35-38.

Declaration of Charles Coles filed by Defendant/Counterclaimant Monolithic Power Systems, Inc.'s in Support of Its Motion for Summary Judgment of Invalidity of Asserted Claims of U. S. Patent No. 6,198,234, dated Nov. 14, 2005.

Declaration of Dean G. Dunlavey filed by Defendant/Counterclaimant Monolithic Power Systems, Inc.'s in Support of Its Motion for Summary Judgment of Invalidity of Asserted Claims of U. S. Patent No. 6,198,234, dated Nov. 14, 2005.

Declaration of Defendant/Counterclaimant Monolithic Power Systems, Inc.'s Expert Witness, Dr. Douglas C. Hopkins, in Support of Its Motion for Summary Judgment of Invalidity of Asserted Claims of U. S. Patent No. 6,198,234, dated Nov. 14, 2005.

Declaration of Doyle Slack filed by Defendant/Counterclaimant Monolithic Power Systems, Inc.'s in Support of Its Motion for Summary Judgment of Invalidity of Asserted Claims of U. S. Patent No. 6,198,234, dated Nov. 14, 2005.

Declaration of Henry C. Su in Support of Plaintiff 02 Micro International Limited's Brief in Response to Third-Party Defendant Microsemi Corporation's Brief Re Claim Construction for U.S. Patent Nos. 5,930,121 and 6,198,234, dated Oct. 26, 2007.

Declaration of Iran A. Lateef in Support of Third-Party Defendant Microsemi Corporation's Brief in Support of its Claim Construction for U.S. Patent Nos. 5,930,121 and 6,198,234, dated Oct. 19, 2007.

Declaration of John A. O'Connor filed by Defendant/Counterclaimant Monolithic Power Systems, Inc.'s in Support of Its Motion for Summary Judgment of Invalidity of Asserted Claims of U. S. Patent No. 6,198,234, dated Nov. 14, 2005.

Declaration of Robert Mammano filed by Defendant/Counterclaimant Monolithic Power Systems, Inc.'s in Support of Its Motion for Summary Judgment of Invalidity of Asserted Claims of U. S. Patent No. 6,198,234, dated Nov 14, 2005.

Defendant/Counterclaimant Monolithic Power Systems, Inc.'s Memorandum of Points and Authorities in Support of Motion for Summary Judgment of Invalidity of Asserted Claims of U. S. Patent No. 5,615,093, dated Nov. 14, 2005.

Defendant/Counterclaimant Monolithic Power Systems, Inc.'s Memorandum of Points and Authorities in Support of Motion for Summary Judgment of Invalidity of Asserted Claims of U. S. Patent No. 6,198,234, dated Nov. 14, 2005.

Defendant/Counterclaimant Monolithic Power Systems, Inc.'s Notice of Motion and Motion for Summary Judgment of Invalidity of Asserted Claims of U. S. Patent No. 5,615,093, dated Nov 14, 2005.

Defendant/Counterclaimant Monolithic Power Systems, Inc.'s Notice of Motion and Motion for Summary Judgment of Invalidity of Asserted Claims of U. S. Patent No. 6,198,234, dated Nov. 14, 2005.

Defendant/Counterclaimant Monolithic Power Systems, Inc.'s Reply Brief in Support of Motion for Summary Judgment of Invalidity of Asserted Claims of U.S. Patent No. 5,615,093, dated Mar. 13, 2006.

Defendant/Counterclaimant Monolithic Power Systems, Inc.'s Reply Brief in Support of Motion for Summary Judgment of Invalidity of Asserted Claims of U.S. Patent No. 6,198,234, dated Mar. 13, 2006.

Dubey, G. K., "Thyristorised Power Controllers"; Halsted Press, 1986; pp. 74-77.

Goodenough, Frank, DC-to-AC Inverter Ups CCFL Lumens Per Watt, Electronic Design, Jul. 10, 1995, pp. 143-148.

IEEE Publication, "Dual Switched Mode Power Converter": Pallab Midya & Fred H. Schlereth; p. 155 1989.

IEEE Publication, "High Frequency Resonant Inverter for Group Dimming Control of Fluorescent Lamp Lighting Systems", K.H. Jee, et al., 1989 149-154.

Int. J. Electronics, "New soft-switching inverter for high efficiency electronic ballast with simple structure" E.C. Nho, et al., 1991, vol. 71, No. 3, 529-541.

Jordan et al., Resonant Fluorescent Lamp Converter Provides Efficient and Compact Solution, Mar. 1993, pp. 424-431.

Micro Linear, ML4878 Single-Stage CCFL Backlight Resonant Inverter, Application Note 68, May 1998, pp. 1-12.

Nguyen, Don J., "Optimizing Mobile Power Delivery". Presented at Intel Developers Forum, Fall 2001, p. 4.

O'Connor, J., Dimmable Cold-Cathode Fluorescent Lamp Ballast Design Using the UC3871, Application Note U-148, pp. 1-15,1995.

PCT International Search Report and Written Opinion mailed Apr. 8, 2008, Appl. No. PCT/US2007/072862 in 12 pages.

Plaintiff Microsemi Corporation's Opposition to Defendant/Counterclaimant Monolithic Power Systems, Inc.'s Motion for Summary Judgment of Invalidity of Asserted Claims of U.S. Patent No. 5,615,093, dated Feb. 13, 2006.

Plaintiff Microsemi Corporation's Opposition to Defendant/Counterclaimant Monolithic Power Systems, Inc.'s Motion for Summary Judgment of Invalidity of Asserted Claims of U.S. Patent No. 6,198,234, dated Feb. 13, 2006.

Plaintiff Microsemi Corporation's Statement of Genuine Issues in Opposition to Defendant/Counterclaimant Monolithic Power Systems, Inc.'s Motion for Summary Judgment of Invalidity of Asserted Claims of U.S. Patent No. 5,615,093, dated Feb. 13, 2006.

Plaintiff Microsemi Corporation's Statement of Genuine Issues in Opposition to Defendant/Counterclaimant Monolithic Power Systems, Inc.'s Motion for Summary Judgment of Invalidity of Asserted Claims of U.S. Patent No. 6,198,234, dated Feb. 13, 2006.

Plaintiff O2 Micro International Limited's Brief in Response to Third-Party Defendant Microsemi Corporation's Brief Re Claim Construction for U.S. Patent Nos. 5,930,121 and 6,198,234, dated Oct. 26, 2007.

Plaintiff O2 Micro International Limited's Preliminary Invalidity Contentions re Third-Party Defendant Microsemi Corporation Patents, dated Sep. 14, 2007.

Supplemental Declaration of Dean G. Dunlavey filed by Defendant/Counterclaimant Monolithic Power Systems, Inc.'s in Support of Its Motion for Summary Judgment of Invalidity of Asserted Claims of U.S. Patent No. 6,198,234, dated Mar. 13, 2006.

Tannas, Lawrence, "Flat Panel Displays and CRTs". ©1985 Van Nostrand Reinhold Company Inc., pp. 96-99.

Third-Party Defendant Microsemi Corporation's Brief in Support of its Claim Construction for U.S. Patent Nos. 5,930,121 and 6,198,234, dated Oct. 19, 2007.

Unitrode Datasheet, Resonant Fluorescent Lamp Driver, UC 1871/2871/3871, May 1993, pp. 1-6.

Unitrode Datasheet, Resonant Fluorescent Lamp Driver, UC 1871/2871/3871, Oct. 1994, pp. 1-6.

Unitrode Product & Applications Handbook 1993-94, U-141, Jun. 1993, pp. i-ii; 9-471-9-478.

Williams, B.W.; "Power Electronics Devices, Drivers, Applications and Passive Components"; Second Edition, McGraw-Hill, 1992; Chapter 10, pp. 218-249.

Williams, Jim, Techniques for 92% Efficient LCD Illumination, Linear Technology Application Note 55, Aug. 1993.

\* cited by examiner

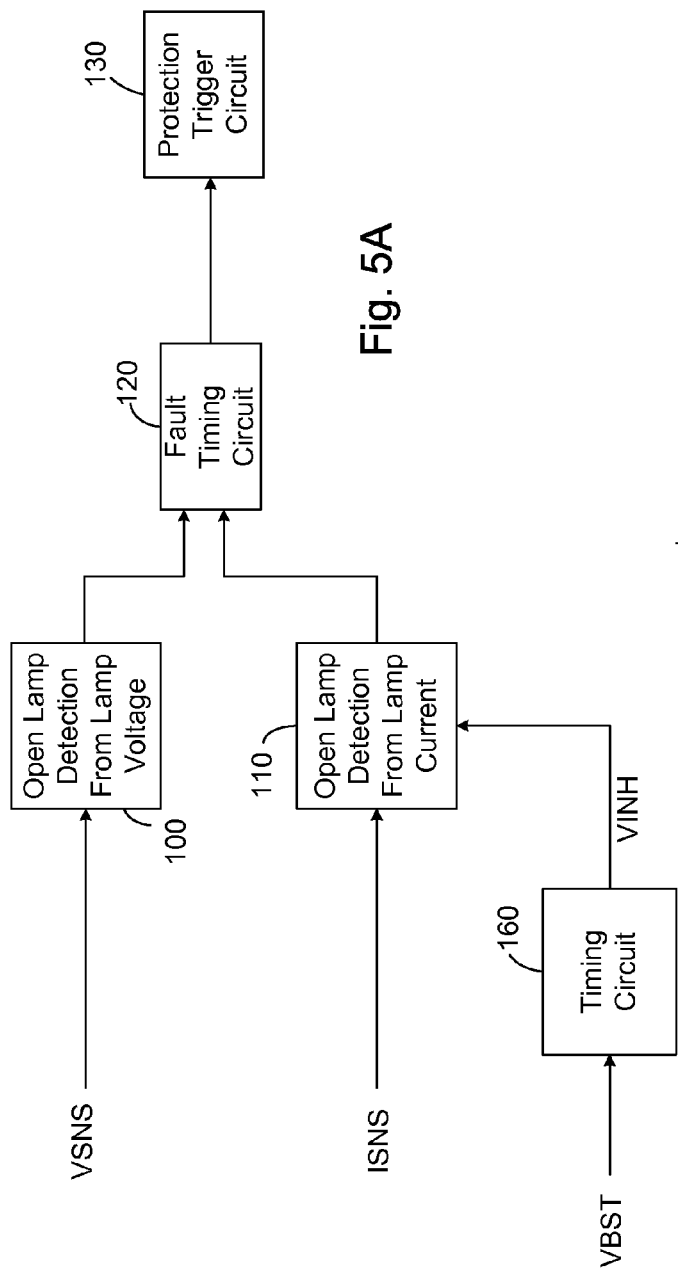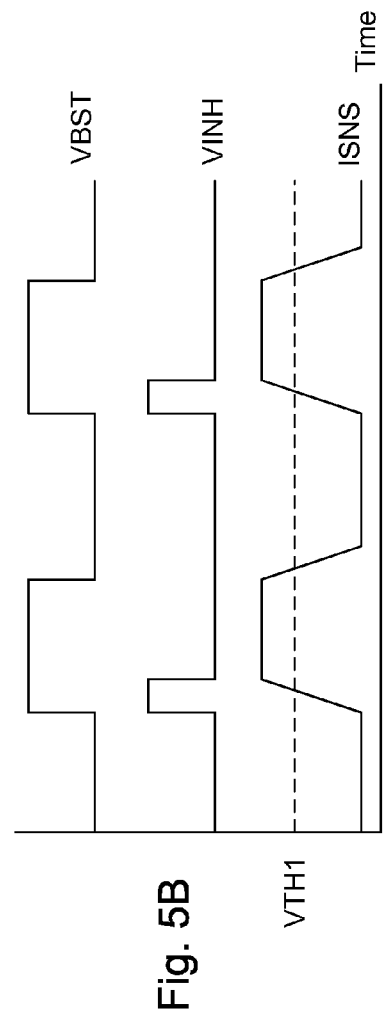
Fig. 5A
Fig. 5B

METHOD AND APPARATUS FOR DRIVING CCFL AT LOW BURST DUTY CYCLE RATES

CROSS-REFERENCE TO RELATED APPLICATIONS

This application claims priority to U.S. Provisional Patent Application Ser. No. 61/116,320 filed Nov. 20, 2009, entitled "Method and Apparatus for Driving CCFL at Low Burst Duty Cycle Rates", the entire contents of which is incorporated herein by reference.

BACKGROUND

The present invention relates to the field of cold cathode fluorescent lamp based lighting and more particularly to an arrangement in which low burst dimming duty cycles are supported.

Fluorescent lamps are used in a number of applications including, without limitation, backlighting of display screens, televisions and monitors. One particular type of fluorescent lamps is a cold cathode fluorescent lamp (CCFL). Such lamps require a high starting voltage (typically on the order of 700 to 1,600 volts) for a short period of time to ionize a gas contained within the lamp tubes and fire or ignite the lamp. This starting voltage may be referred to herein as a strike voltage or striking voltage. After the gas in a CCFL is ionized and the lamp is fired, less voltage is needed to keep the lamp on. Preferably the CCFL is alternately powered from each end so as to maintain an even brightness across the lamp.

In liquid crystal display (LCD) applications, a backlight is needed to illuminate the screen so as to make a visible display. Backlight systems in LCD or other applications typically include one or more CCFLs and an inverter system to provide both DC to AC power conversion and control of the lamp brightness, with the resultant AC signal preferably arranged to perform the aforementioned alternate powering. Even brightness across the panel and clean operation of the inverter system with low switching stresses, low EMI, and low switching losses is desirable.

In CCFL backlight applications the inverter system typically comprises a DC to AC controller in cooperation with external components operative to generate an AC power of a few hundred Volts to over one thousand Volts RMS so as to drive the lamps at a frequency of about 30 to 70 KHz. The DC to AC controller alone is sometimes referred to as an inverter. This high voltage raises certain safety issues, and as a result CCFL controllers typically provide an open lamp detection functionality. The open lamp detection functionality monitors a current, and optionally a voltage, associated with each one of the load CCFLs to detect if the CCFLs present an open circuit to the controller, referred hereinto below as an open lamp condition. Such an open lamp condition may be the result of missing, defective or burnt out lamps. Detection of an open lamp condition is normally accomplished by comparing the sensed lamp current to a pre-set threshold. If the sensed lamp current is lower than the pre-set threshold an open lamp condition is considered detected. Upon detection of an open lamp condition, the open lamp detection functionality is operative to shut down the controller so as to prevent the appearance of a high voltage AC signal without a valid load. In order to avoid transient response, typically the open lamp detection functionality requires an open lamp condition to be found for a plurality of cycles of the high frequency AC and the open lamp condition is cleared upon detection of a sensed lamp current indicative of normal operation. The plurality of cycles may be counted digitally in a counter, or by charging a capacitor with a known current source whenever an open lamp condition is detected. The lamp current indication of normal operation is in one embodiment a current greater than the pre-set threshold, and in another embodiment a separate higher threshold is provided to clear the open lamp condition.

In many such applications, such as backlighting for LCD based televisions, dimming is required to adjust the brightness of the backlight in order to produce satisfactory pictures in various ambient lighting conditions and various visual conditions. Dimming is typically achieved by one or both of analog dimming and burst dimming. Technically speaking, analog dimming controls the amplitude of the CCFL current, whereas burst dimming turns the CCFL on and off at a duty cycle so as to adjust the average brightness of the backlight over time. At any particular amplitude of the CCFL current, a lower duty cycle of burst dimming results in a dimmed light as compared to a larger duty cycle of burst dimming. The frequency of the burst dimming cycle is typically in the range of 150-250 Hz, and thus functions as an envelope for the higher frequency AC lamp voltage.

One limitation of CCFL is that the light may extinguish completely when the lamp is operated at a low current level. Furthermore, the efficiency of a CCFL at low current levels is lower than the efficiency of the CCFL at higher current levels. As a result a minimum lamp current limit is defined, which effectively limits the range of analog dimming. As a result, burst dimming is almost universally used, with the lamp current set to an optimum value and the brightness controlled by the burst duty cycle.

FIG. 1 illustrates a high level schematic diagram of a backlighting arrangement according to the prior art, illustrating an embodiment of the above open lamp condition detection. The backlighting arrangement comprises a plurality of CCFLs 10, a plurality of sense resistors RS each associated with a particular cold cathode fluorescent lamp 10, a resistor RD1 and a resistor RD2, a diode OR circuit 15 comprising a plurality of diodes DS each associated with a particular CCFL 10, a controller 20 and a step-up transformer 90. Controller 20 comprises a pulse generator 30, an open lamp detection functionality 35 and a lamp error amplifier 80. Open lamp detection functionality 35 comprises a comparator 40, a comparator 50, an OR gate 60 and an error cycle count functionality 70.

A received burst dimming pulse, denoted VBST is connected to an input of pulse generator 30. The output of pulse generator 30 is connected to a first end of the primary winding of step-up transformer 90, and the second end of the primary winding is connected to a first common point, illustrated as a chassis ground. A first end of the secondary winding of step-up transformer 90 is connected to a second common point, which may be different from the common point of the primary winding, and is illustrated as a local ground. A second end of the secondary winding of step-up transformer 90 is connected to a first end of resistor RD1 and to a first end of each of the plurality of CCFLs 10. The second end of each CCFL 10 is connected to a first end of the associated sense resistor RS and to the anode of a particular one of the diodes DS of diode OR circuit 15. The second end of each of the associated sense resistors RS are connected to the second common point.

The second end of resistor RD1 is connected to a first end of resistor RD2 and to the non-inverting input of comparator 40, denoted input VSNS of controller 20. The second end of resistor RD2 is connected to the second common point. A maximum voltage level, denoted VTH2, is connected to the inverting input of comparator 40. The output of diode OR circuit 15 is connected to the inverting input of comparator 50 and to the non-inverting input of error amplifier 80, denoted input ISNS of controller 20. An open lamp detection threshold current level, denoted VTH1, is connected to the non-inverting input of comparator 50.

The output of comparator 40 is connected to a first input of OR gate 60. The output of comparator 50 is connected to a second input of OR gate 60 and via an inverter to the clear input of error cycle count functionality 70. The output of OR gate 60 is connected to the input of error cycle count functionality 70. The output of error cycle count functionality 70, denoted FAULT, is connected to an input of pulse generator 30. A lamp current reference level, denoted IREF, is connected to the inverting input of error amplifier 80, and the output of error amplifier 80 is connected to an input of pulse generator 30. Error cycle count functionality 70 is illustrated as a digital counter, however this is not meant to be limiting in any way. In another embodiment error cycle count functionality 70 is implemented in an analog fashion with a capacitor arranged to receive a fixed current, and a fault signal will be output when a certain voltage level is reached.

VBST is illustrated as a received gating signal, however this is not meant to be limiting in any way. In one embodiment, VBST is derived from a received analog signal whose level is translated internally into the duty cycle for the burst dimming signal.

In operation, pulse generator 30 is operative to generate a pulse width modulated high frequency square wave gated by a low frequency burst dimming pulse VBST and thereby drive the primary side of step-up transformer 90. In one embodiment, pulse generator 30 drives an H-bridge switching arrangement connected to the primary side of step up transformer 90, as described in U.S. Pat. No. 5,930,121 to Henry, the entire contents of which is incorporated herein by reference. Step-up transformer 90 steps up the voltage of the signal received at the primary, and in cooperation with self inductance of step-up transformer 90 and parasitic capacitance of CCFLs 10, filters the resultant AC voltage to supply the AC voltage necessary for operation of CCFLs 10.

The voltage across the CCFLs 10 is divided by the voltage divider of resistors RD1 and RD2 and the divided voltage is presented via input VSNS to be compared with maximum voltage level VTH2. The current through CCFLs 10 are each sampled across the respective sense resistor RS, and the greater current is passed through diode OR circuit 15 and presented via input ISNS to be compared with open lamp detection threshold current level VTH1. The voltage representation of the current presented via input ISNS is further compared to lamp current reference level IREF, and any error is amplified and transmitted to pulse generator 30 which acts to increase or decrease the duty rate of the pulse width modulated output of pulse generator 30 so as to ensure that ISNS coincides with IREF when CCFLs 10 are being driven.

Open lamp detection functionality 35 is operative to compare the divided representation of the voltage across CCFLs 10 with maximum voltage level VTH2, and the representation of the greater current through the CCFLs 10 with open lamp detection threshold current level VTH1, and output an error signal to error cycle count functionality 70 whenever the divided representation of the voltage across CCFLs 10 exceeds maximum voltage level VTH2 or the representation of the greater current through CCFLs 10 is less than open lamp detection threshold current level VTH1. It is to be understood that the maximum voltage is developed across CCFLs 10 when no current is flowing, and thus voltage exceeding maximum voltage level VTH2 is indicative of an open lamp condition. Error cycle count functionality 70 is operative to count a predetermined number of error conditions, i.e. an error condition maintained for a predetermined number of cycles of pulse generator 30, and in the event that the error is maintained to assert the FAULT signal to pulse generator 30 thereby disabling pulse generator 30. In the event that the representation of the greater current through CCFLs 10 is greater than or equal to the open lamp detection threshold current level VTH1 before the FAULT signal is asserted, the output of comparator 50 clears error cycle count functionality 70.

One problem with the above described burst dimming is audible noise. When the CCFL is turned on and off electro-mechanical vibration occurs due to the sharp change of electro-magnetic force in the associated components, especially in the transformers. As indicated above, the dimming frequency is in the range of 150-250 Hz, which is well within the audible frequency range.

An effective method to reduce such electro-mechanical vibration is to control the profile of the burst lamp current so as to ramp up gradually when the burst dimming control changes from one state to another. Thus, when turning the lamp on, the current resultant from the high frequency AC voltage is ramped up to the nominal value, and when turning the lamp off, the current resultant from the high frequency AC voltage is ramped down from the nominal value until the lamp is off.

Controlling the profile of the burst lamp current successfully suppresses the audible noise, however because of the ramp up and the ramp down of the burst current, there will be a small period at the bottom of the ramp slope wherein the lamp current is lower than the pre-set threshold, described above in relation to VTH1, and open lamp detection functionality 35 will assert the FAULT signal thereby shutting down pulse generator 30. At low duty cycles of burst dimming the whole or a significant portion of the burst on period can result in a false open lamp protection of the inverter, as will be described below in relation to FIG. 2. Therefore most CCFL inverters cannot work at low burst duty cycles, specifically as low as several percent. This is disadvantageous as in today's market full darkness of the screen becomes one of the important performance requirements for high quality displays. To fulfill such a requirement the burst dimming operation has to be able to work stably at very small duty cycles down to zero percent.

FIG. 2 illustrates a graph of certain signals of the backlighting arrangement of FIG. 1, in which the x-axis represents a common time axis and the y-axis represents voltages in arbitrary units. The burst dimming signal, denoted VBST, in addition to VTH1 and ISNS are illustrated. An additional analog representation of error cycle count functionality 70 is shown, denoted Error_Count, and a trigger value above which assertion of the FAULT signal is asserted, denoted Fault_Level.

At each burst dimming pulse of VBST, the current through CCFLs 10 is ramped up to its nominal value as shown by the ISNS representation. The burst dimming is illustrated as being at a very low duty cycle, for instance around 10%, and therefore ISNS does not reach the VTH1 level before being ramped back down. Thus, for each burst dimming pulse, an additional error count is accumulated, as illustrated by the climbing of signal Error_Count. Error_Count is not cleared because of the failure of ISNS to be equal to, or greater than, VTH1. After a few cycles, Error_Count exceeds Fault Level, and the FAULT signal will thus be asserted, resulting in shut down of controller 20.

What is desired, and not provided by the prior art, is a backlighting arrangement that can provide a full range of burst dimming, while maintaining support for open lamp detection.

SUMMARY

Accordingly, it is a principal object to overcome at least some of the disadvantages of prior art. This is provided in certain embodiments by a backlighting arrangement in which shut down of the pulse generator responsive to open lamp current detection derived from the lamp current feedback signal is prevented whenever the burst dimming duty cycle is less than a predetermined value.

In certain embodiments the shut down is prevented by disabling a comparator associated with the lamp current feedback signal. In other embodiments the shut down is prevented by overriding the lamp current feedback signal with a predetermined voltage.

In certain embodiments the shut down is prevented by disabling a comparator associated with the lamp current feedback signal for a predetermined number of cycle periods of the pulse generator coincident with the rising edge of the burst dimming cycle. In other embodiments the shut down is prevented by overriding the lamp current feedback signal with a predetermined voltage for a predetermined number of cycle periods of the pulse generator coincident with the rising edge of the burst dimming cycle.

In certain embodiments the shut down is prevented by disabling an error counter for a predetermined number of cycle periods of the pulse generator coincident with the rising edge of the burst dimming cycle. In other embodiments the shut down is prevented by ramping a reference current signal for a predetermined number of cycle periods of the pulse generator coincident with the rising edge of the burst dimming.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 5A illustrates a high level block diagram of a system operative to disable the open lamp current detection from lamp current feedback signal for a short period at the burst dimming rising edge according to an exemplary embodiment;

FIG. 5B illustrates a graph of certain signals of the system of FIG. 5A;

FIG. 8A illustrates a high level block diagram of a system operative to adjust the open lamp current threshold level at the burst dimming rising edge, according to an exemplary embodiment comprising an electronically controlled switch;

DETAILED DESCRIPTION OF PREFERRED EMBODIMENTS

Figure 1:
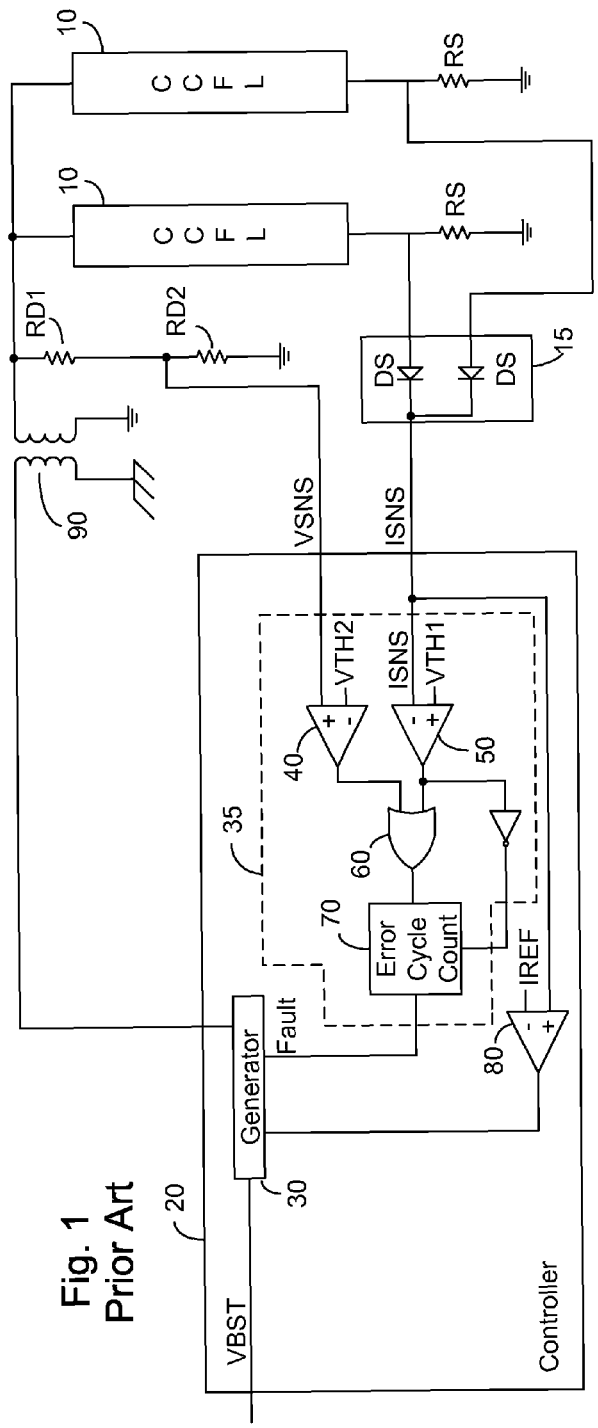
FIG. 1 illustrates a high level schematic diagram of a backlighting arrangement including open lamp detection in accordance with the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term connected as used herein is not meant to be limited to a direct connection, and the use of appropriate resistors, capacitors and inductors does not exceed the scope thereof.

Figure 3:
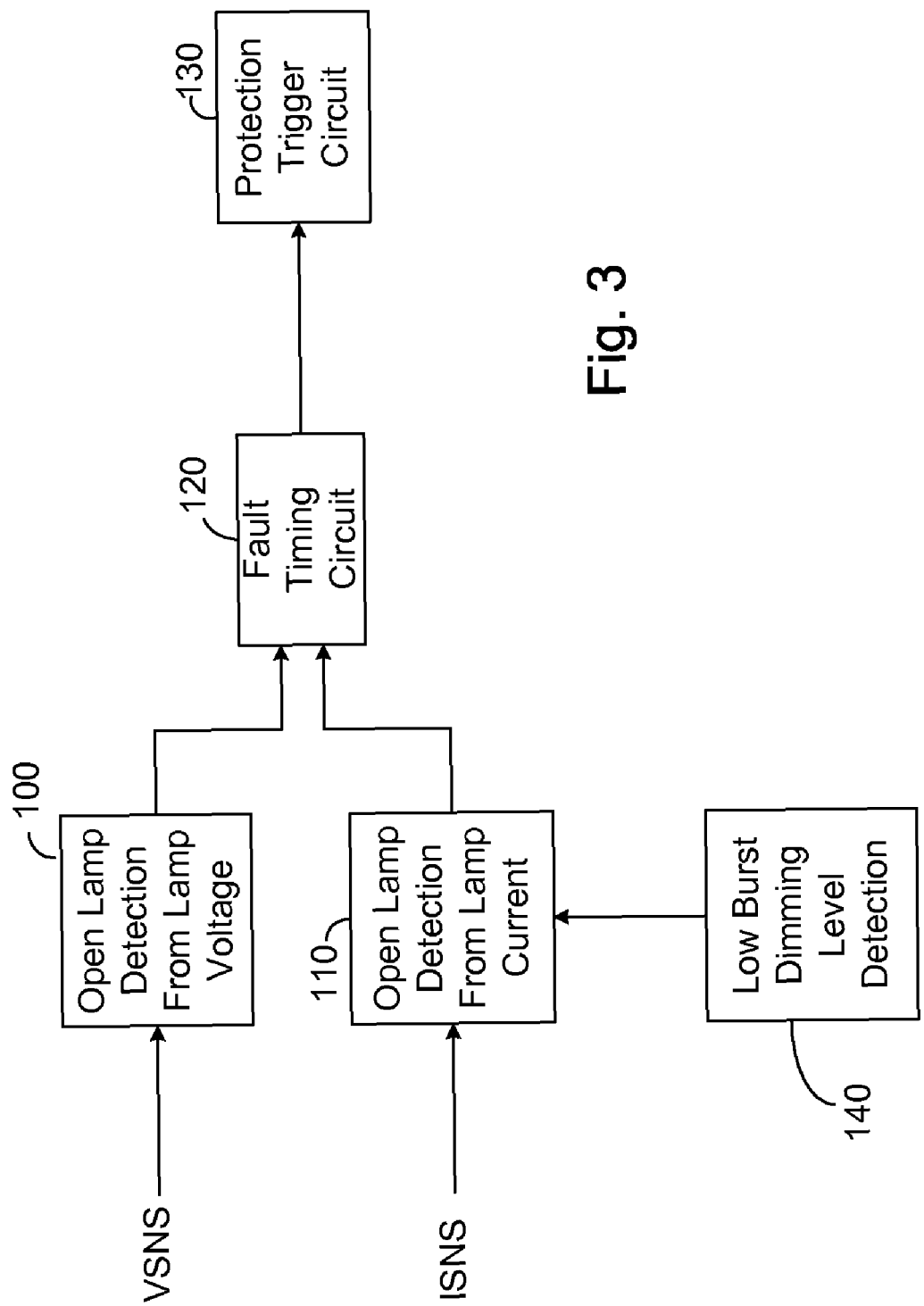
FIG. 3 illustrates a high level block diagram of a system operative to disable the open lamp current detection from lamp current feedback signal at low duty cycles according to an exemplary embodiment.

FIG. 3 illustrates a high level block diagram of a system comprising an open lamp detection from lamp voltage functionality 100, an open lamp detection from lamp current functionality 110, a fault timing circuit 120, a protection trigger circuit 130, a low burst dimming level detection functionality 140, a lamp voltage feedback signal VSNS and a lamp current feedback signal ISNS. Fault timing circuit 120 is comprised of an analog capacitor charging circuit, or a digital counting circuit as described above in relation to error cycle count functionality 70 of FIG. 1. Lamp voltage feedback signal VSNS is connected to the input of open lamp detection from lamp voltage functionality 100, and the output of open lamp detection from lamp voltage functionality 100 is connected to a first input of fault timing circuit 120. Lamp current feedback signal ISNS is connected to the input of open lamp detection from lamp current functionality 110 and the output of open lamp detection from lamp current functionality 110 is connected to a second input of fault timing circuit 120. Protection trigger circuit 130 is connected to the output of fault timing circuit 120 and low burst dimming level detection functionality 140 is connected to open lamp detection from lamp current functionality 110. Open lamp detection from lamp voltage functionality 100 is in one embodiment implemented as described above in relation to comparator 40 of FIG. 1. Open lamp detection from lamp current functionality 110 is in one embodiment implemented as described above in relation to comparator 50 of FIG. 1, with the exception that comparator 50 is replaced with a comparator having an disable input. In the event that the disable input is asserted, the output of the comparator is set to low.

Figure 2:
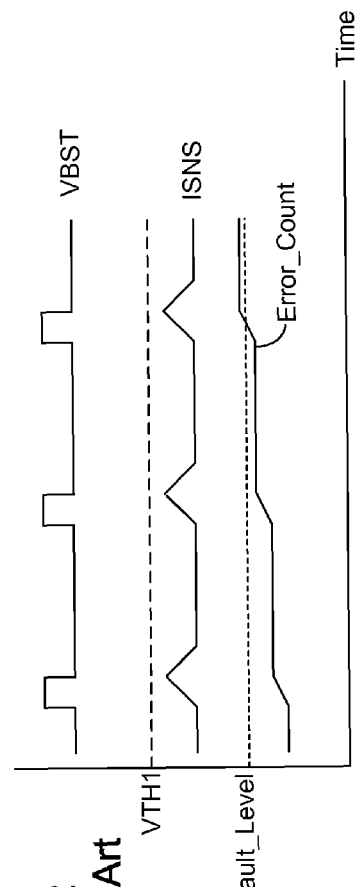
FIG. 2 illustrates a graph of certain signals of the backlighting arrangement of FIG. 1.

In operation, if one of open lamp detection from lamp voltage functionality 100 and open lamp detection from lamp current functionality 110 detects an open lamp, an error signal is sent to fault timing circuit 120. If the error signal is sustained for a specific amount of time an open lamp is detected, as described above in relation to FIG. 1 and FIG. 2, and protection trigger circuit 130 is operative to shut down the inverter. At low burst duty cycles, such as around 10% and below, low burst dimming level detection functionality 140 is operative to detect the low burst dimming level and disable open lamp detection from lamp current functionality 110. While open lamp detection from lamp current functionality 110 is disabled, if an open lamp exists it will be detected by open lamp detection from lamp voltage functionality 100.

Figure 4A:
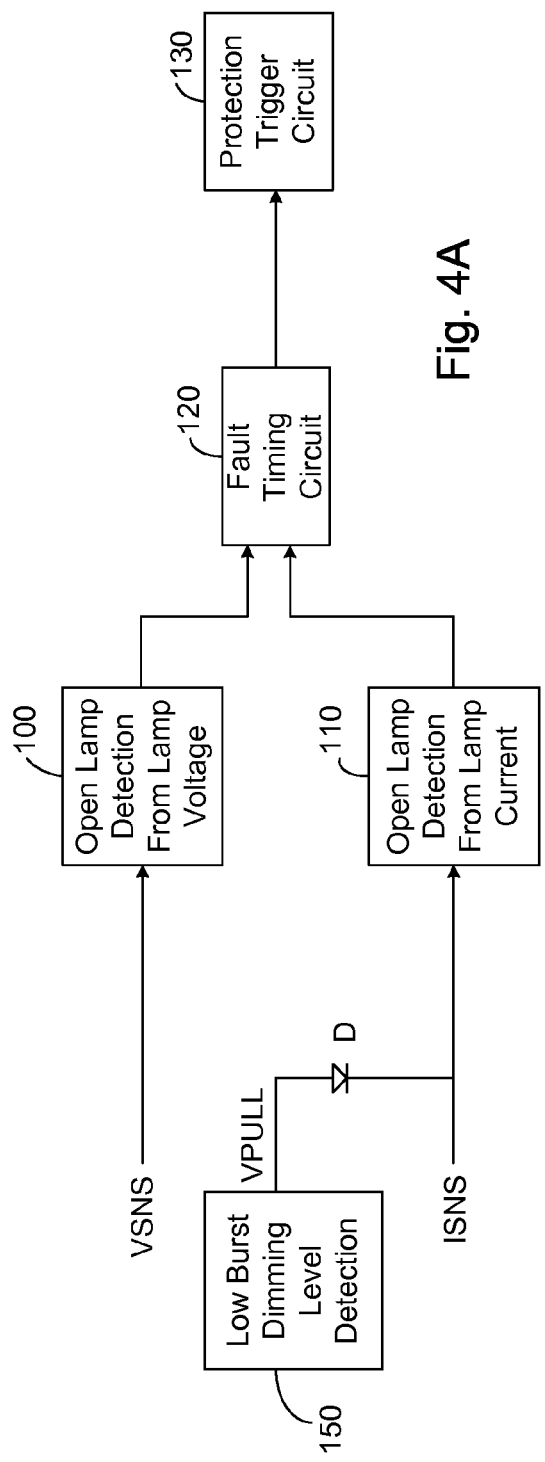
FIG. 4A illustrates a high level block diagram of a system operative to pull up the lamp feedback signal to a level above the open lamp detection threshold and below the lamp current reference level for the entire burst on period according to an exemplary embodiment.

FIG. 4A illustrates a high level block diagram of a system comprising an open lamp detection from lamp voltage functionality 100, an open lamp detection from lamp current functionality 110, a fault timing circuit 120, a protection trigger circuit 130, a low burst dimming level detection functionality 150, a lamp voltage feedback signal VSNS, a lamp current feedback signal ISNS, and a unidirectional circuit shown as diode D. Fault timing circuit 120 is comprised of an analog capacitor charging circuit, or a digital counting circuit as described above in relation to error cycle count functionality 70 of FIG. 1. Lamp voltage feedback signal VSNS is connected to the input of open lamp detection from lamp voltage functionality 100, and the output of open lamp detection from lamp voltage functionality 100 is connected to a first input of fault timing circuit 120. Lamp current feedback signal ISNS is connected to the input of open lamp detection from lamp current functionality 110 and the output of open lamp detection from lamp current functionality 110 is connected to a second input of fault timing circuit 120. Protection trigger circuit 130 is connected to the output of fault timing circuit 120. The output of low burst dimming level detection functionality 150, denoted VPULL, is connected via unidirectional circuit D to lamp current feedback signal ISNS. Open lamp detection from lamp voltage functionality 100 is in one embodiment implemented as described above in relation to comparator 40 of FIG. 1. Open lamp detection from lamp current functionality 110 is in one embodiment implemented as described above in relation to comparator 50 of FIG. 1.

In operation, if one of open lamp detection from lamp voltage functionality 100 and open lamp detection from lamp current functionality 110 detects an open lamp, an error signal is sent to fault timing circuit 120. If the error signal is sustained for a specific amount of time an open lamp is detected, as described above in relation to FIG. 1 and FIG. 2, and protection trigger circuit 130 is operative to shut down the inverter. At low burst duty cycles, such as around 10% and below, low burst dimming level detection functionality 150 is operative to detect the low burst dimming level and output a voltage clamping level VPULL, selected to be above open lamp detection threshold current level VTH1 of FIG. 1 and FIG. 2 and below lamp current reference level IREF of FIG. 1. The output of low burst dimming level detection functionality 150 is channeled by unidirectional circuit D to pull up lamp current feedback signal ISNS. When the voltage representation of the lamp current rises above clamping voltage VPULL the clamp circuit is cut off, i.e. unidirectional circuit D becomes reverse biased and becomes open, and error amplifier 80 of FIG. 1 resumes to control the lamp current feedback signal ISNS at lamp current reference level IREF.

Figure 4B:
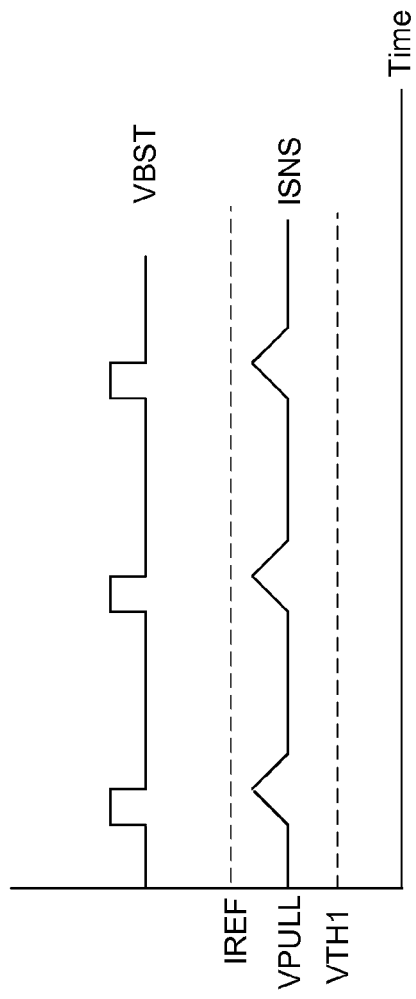
FIG. 4B illustrates a graph of certain signals of the system of FIG. 4A.

FIG. 4B illustrates a graph of certain signals of the embodiment of FIG. 4A, in which the x-axis represents a common time axis and the y-axis represents voltages in arbitrary units. Signals VBST and ISNS are illustrated as well as reference levels IREF and VTH1. As described above in FIG. 4A, during the burst on period, lamp current feedback signal ISNS is pulled up to a clamping level, VPULL, above open lamp detection threshold VTH1 and below lamp current reference level IREF. As current through the CCFLs 10 begins to rise the increased value of ISNS may pass level VPULL, thereby shutting off unidirectional circuit D.

FIG. 5A illustrates a high level block diagram of a system comprising an open lamp detection from lamp voltage functionality 100, an open lamp detection from lamp current functionality 110, a fault timing circuit 120, a protection trigger circuit 130, a lamp voltage feedback signal VSNS, a lamp current feedback signal ISNS, a timing circuit 160, and a burst dimming pulse denoted VBST. Fault timing circuit 120 is comprised of an analog capacitor charging circuit, or a digital counting circuit as described above in relation to error cycle count functionality 70 of FIG. 1. Lamp voltage feedback signal VSNS is connected to the input of open lamp detection from lamp voltage functionality 100, and the output of open lamp detection from lamp voltage functionality 100 is connected to a first input of fault timing circuit 120. Lamp current feedback signal ISNS is connected to the input of open lamp detection from lamp current functionality 110 and the output of open lamp detection from lamp current functionality 110 is connected to a second input of fault timing circuit 120. Protection trigger circuit 130 is connected to the output of fault timing circuit 120. Timing circuit 160 is connected to receive burst dimming pulse VBST and to output a signal denoted VINH which is received by open lamp detection from lamp current functionality 110.

Open lamp detection from lamp voltage functionality 100 is in one embodiment implemented as described above in relation to comparator 40 of FIG. 1. Open lamp detection from lamp current functionality 110 is in one embodiment implemented as described above in relation to comparator 50 of FIG. 1, with the exception that comparator 50 is replaced with a comparator having an disable input. In the event that the disable input is asserted, the output of the comparator is set to low. Timing circuit 160 may be implemented as one of an analog and digital timing circuit.

In operation, if one of open lamp detection from lamp voltage functionality 100 and open lamp detection from lamp current functionality 110 detects an open lamp, an error signal is sent to fault timing circuit 120. If the error signal is sustained for a specific amount of time an open lamp is detected, as described above in relation to FIG. 1 and FIG. 2, and protection trigger circuit 130 is operative to shut down the inverter. At the rise of burst dimming pulse VBST, timing circuit 160 enables signal VINH to disable open lamp detection from lamp current feedback signal for a number of cycles. Since there is only a short period, normally less than 10 lamp frequency cycles, at the rising edge of burst dimming pulse VBST that a false open lamp would be seen from the lamp current feedback, open lamp detection from lamp current feedback can be disabled by timing circuit 160 for a short period and resume thereafter. Open lamp detection is normally disabled during the entire burst off period including the falling edge of the burst on period, therefore disabling of the open lamp detection is only necessary during the rise of burst dimming pulse VBST.

FIG. 5B illustrates a graph of certain signals of the embodiment of FIG. 5A, in which the x-axis represents a common time axis and the y-axis represents voltages in arbitrary units. Signals VBST, VINH and ISNS are illustrated as well as reference level VTH1. As described above in relation to FIG. 5A, at the rising edge of burst dimming pulse VBST, signal VINH disables the open lamp detection from lamp current feedback for a portion of burst dimming pulse VBST, thereby preventing false detection of an open lamp while lamp current feedback signal ISNS is below open lamp detection threshold VTH1. In the event of a short burst dimming cycle, VINH will effectively prevent detection of an open lamp due to failure of ISNS to achieve the level VTH1.

Figure 6A:
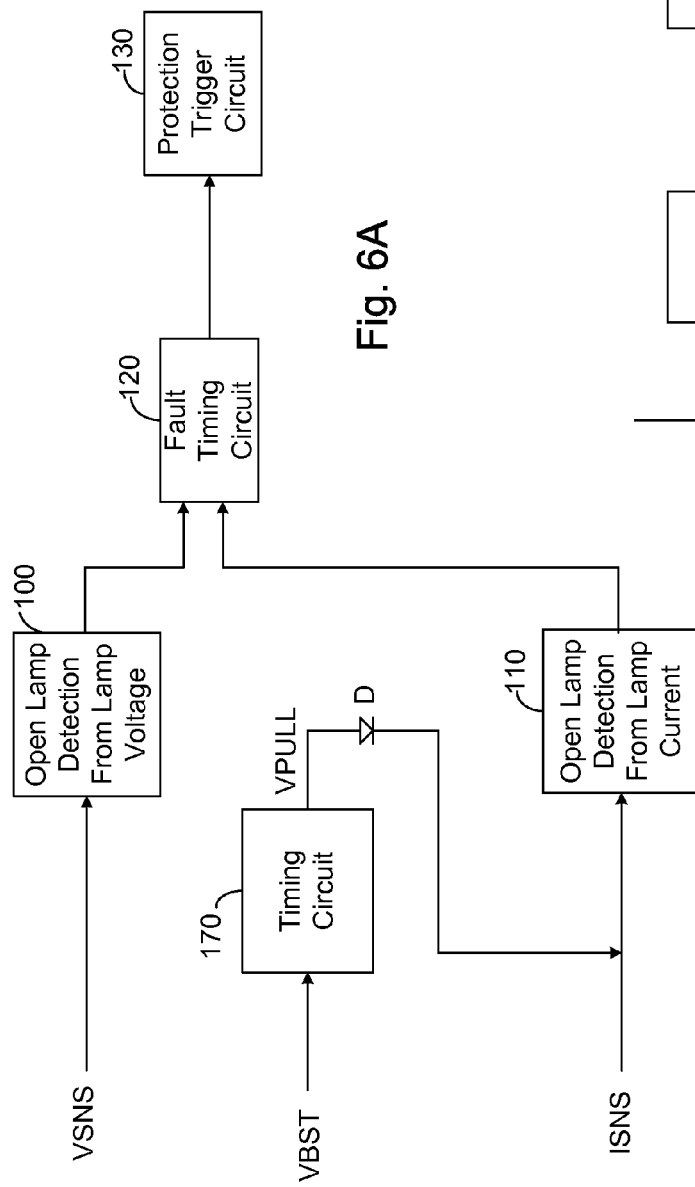
FIG. 6A illustrates a high level block diagram of a system operative to pull up the lamp feedback signal to a value above the open lamp threshold and below the lamp current reference signal for a short period at the burst dimming rising edge, according to an exemplary embodiment.

FIG. 6A illustrates a high level block diagram of a system comprising an open lamp detection from lamp voltage functionality 100, an open lamp detection from lamp current functionality 110, a fault timing circuit 120, a protection trigger circuit 130, a lamp voltage feedback signal VSNS, a lamp current feedback signal ISNS, a timing circuit 170, a burst dimming pulse VBST and a unidirectional circuit D, illustrated as a diode. Fault timing circuit 120 is comprised of an analog capacitor charging circuit, or a digital counting circuit as described above in relation to error cycle count functionality 70 of FIG. 1. Lamp voltage feedback signal VSNS is connected to the input of open lamp detection from lamp voltage functionality 100, and the output of open lamp detection from lamp voltage functionality 100 is connected to a first input of fault timing circuit 120. Lamp current feedback signal ISNS is connected to the input of open lamp detection from lamp current functionality 110 and the output of open lamp detection from lamp current functionality 110 is connected to a second input of fault timing circuit 120. Protection trigger circuit 130 is connected to the output of fault timing circuit 120. Timing circuit 170 is connected to receive burst dimming pulse VBST and to output a signal denoted VPULL which is connected via unidirectional circuit D to lamp current feedback signal ISNS, and is operative to clamp ISNS to a minimum value of VPULL when active.

Open lamp detection from lamp voltage functionality 100 is in one embodiment implemented as described above in relation to comparator 40 of FIG. 1. Open lamp detection from lamp current functionality 110 is in one embodiment implemented as described above in relation to comparator 50 of FIG. 1. Timing circuit 170 may be implemented as one of an analog and digital timing circuit.

In operation, if one of open lamp detection from lamp voltage functionality 100 and open lamp detection from lamp current functionality 110 detects an open lamp, an error signal is sent to fault timing circuit 120. If the error signal is sustained for a specific amount of time an open lamp is detected, as described above in relation to FIG. 1 and FIG. 2, and protection trigger circuit 130 is operative to shut down the inverter. At the rise of burst dimming pulse VBST, timing circuit 170 outputs signal VPULL which pulls up ISNS, for a predetermined number of cycles, to a minimum level above open lamp detection threshold VTH1 of FIGS. 1, 2 and below lamp current reference level IREF.

Since there is only a short period, normally less than 10 lamp frequency cycles, at the rising edge of burst dimming pulse VBST that a false open lamp would be seen from the lamp current feedback, open lamp detection from lamp current feedback can be effectively disabled by timing circuit 170 for a short period and resume thereafter. Open lamp detection is normally disabled during the entire burst off period including the falling edge of the burst on period, therefore disabling of the open lamp detection is only necessary during the rise of burst dimming pulse VBST.

Figure 6B:
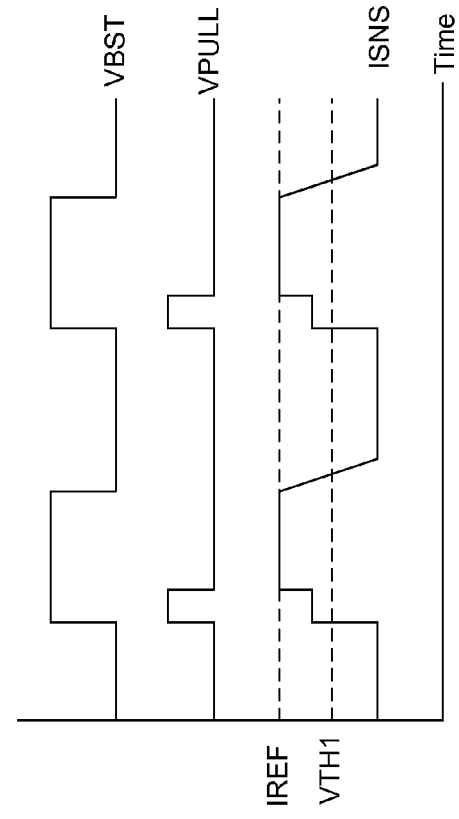
FIG. 6B illustrates a graph of certain signals of the system of FIG. 6A.

FIG. 6B illustrates a graph of certain signals of the embodiment of FIG. 6A, in which the x-axis represents a common time axis and the y-axis represents voltages in arbitrary units. Signals VBST, VPULL and ISNS are illustrated as well as reference level VTH1 and IREF. As described above in FIG. 6A at the rise of burst dimming pulse VBST signal VPULL is asserted for a predetermined short period thereby clamping lamp current feedback signal ISNS to a minimum level above open lamp detection threshold VTH1 and below current reference level IREF. In the event of a short burst dimming cycle, VPULL will effectively prevent detection of an open lamp due to failure of ISNS to achieve the level VTH1.

Figure 7A:
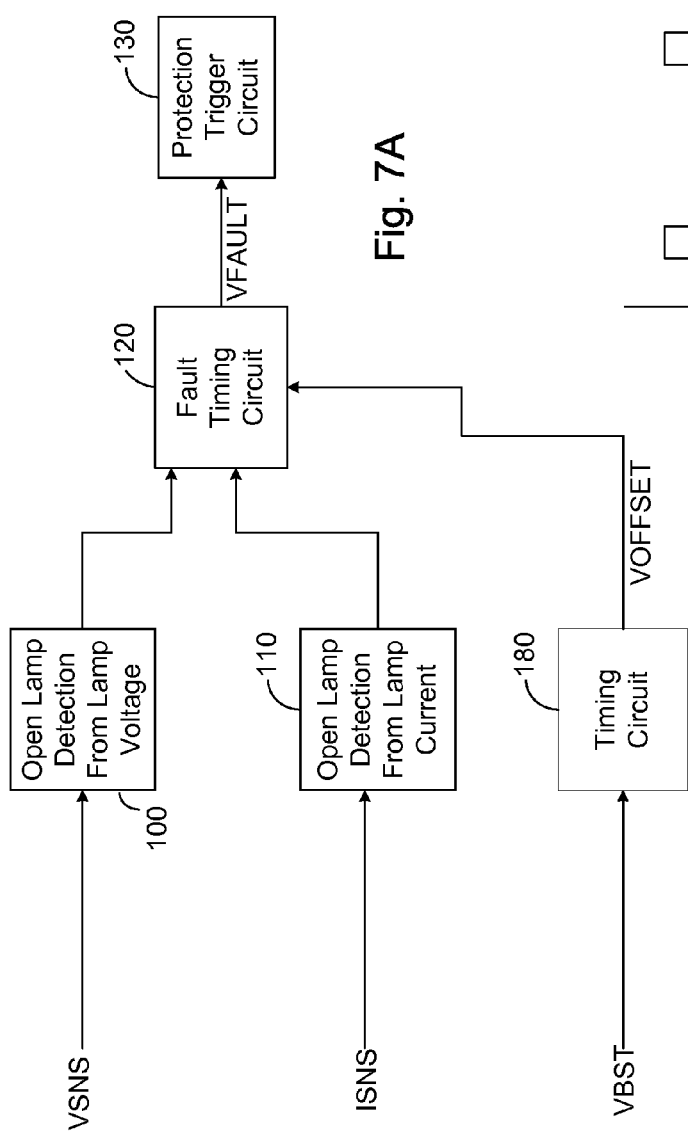
FIG. 7A illustrates a high level block diagram of a system operative to provide a pre-offset to the open lamp timing circuit at the burst dimming rising edge, according to an exemplary embodiment.

FIG. 7A illustrates a high level block diagram of a system comprising an open lamp detection from lamp voltage functionality 100, an open lamp detection from lamp current functionality 110, a fault timing circuit 120, a protection trigger circuit 130, a lamp voltage feedback signal VSNS, a lamp current feedback signal ISNS, a timing circuit 180, and a burst dimming pulse VBST. Fault timing circuit 120 is comprised of an analog capacitor charging circuit, or a digital counting circuit as described above in relation to error cycle count functionality 70 of FIG. 1. Lamp voltage feedback signal VSNS is connected to the input of open lamp detection from lamp voltage functionality 100, and the output of open lamp detection from lamp voltage functionality 100 is connected to a first input of fault timing circuit 120. Lamp current feedback signal ISNS is connected to the input of open lamp detection from lamp current functionality 110 and the output of open lamp detection from lamp current functionality 110 is connected to a second input of fault timing circuit 120. Protection trigger circuit 130 is connected to the output of fault timing circuit 120. Timing circuit 180 is connected to receive burst dimming pulse VBST and to output a pre-offset signal denoted VOFFSET which is received by fault timing circuit 120. Fault timing circuit 120 outputs a fault signal denoted VFAULT which is received by protection trigger circuit 130.

Open lamp detection from lamp voltage functionality 100 is in one embodiment implemented as described above in relation to comparator 40 of FIG. 1. Open lamp detection from lamp current functionality 110 is in one embodiment implemented as described above in relation to comparator 50 of FIG. 1. Timing circuit 180 may be implemented as one of an analog and digital timing circuit.

In operation, if one of open lamp detection from lamp voltage functionality 100 and open lamp detection from lamp current functionality 110 detects an open lamp, an error signal is sent to fault timing circuit 120. If the error signal is sustained for a specific amount of time an open lamp is detected, as described above in relation to FIG. 1 and FIG. 2, and protection trigger circuit 130 is operative to shut down the inverter. As described above, in order to avoid transient response, typically fault timing circuit 120 requires the error signal to be valid for a plurality of burst cycles and only then outputs fault signal VFAULT to protection trigger circuit 130 thereby shutting down the operation of the lamp, in one embodiment by outputting the FAULT signal of FIG. 1. At the rising edge of burst dimming pulse VBST, timing circuit 180 sends pre-offset signal VOFFSET to fault timing circuit 120. Pre-offset signal VOFFSET provides a pre-determined discharge for the timing capacitor if fault timing circuit 120 is an analog capacitor charging circuit, or a pre-determined decrement of the fault timing counter if fault timing circuit 120 is a digital counting circuit. The amount of pre-offset provided, i.e. the discharge for the timing capacitor or the decrement count of the fault timing counter, is set to be equal or slightly greater than the incremental timing effect caused by the open lamp detection at the rising edge of burst dimming pulse VBST. Thus the false open lamp detection as a result of ramping of the burst signal is inhibited and true open lamp conditions are still detected. Since the open lamp timing detection functionality typically requires the error signal to be valid for a plurality of burst cycles, in another embodiment pre-offset signal VOFFSET is provided at the falling edge of burst dimming pulse VBST.

Figure 7B:
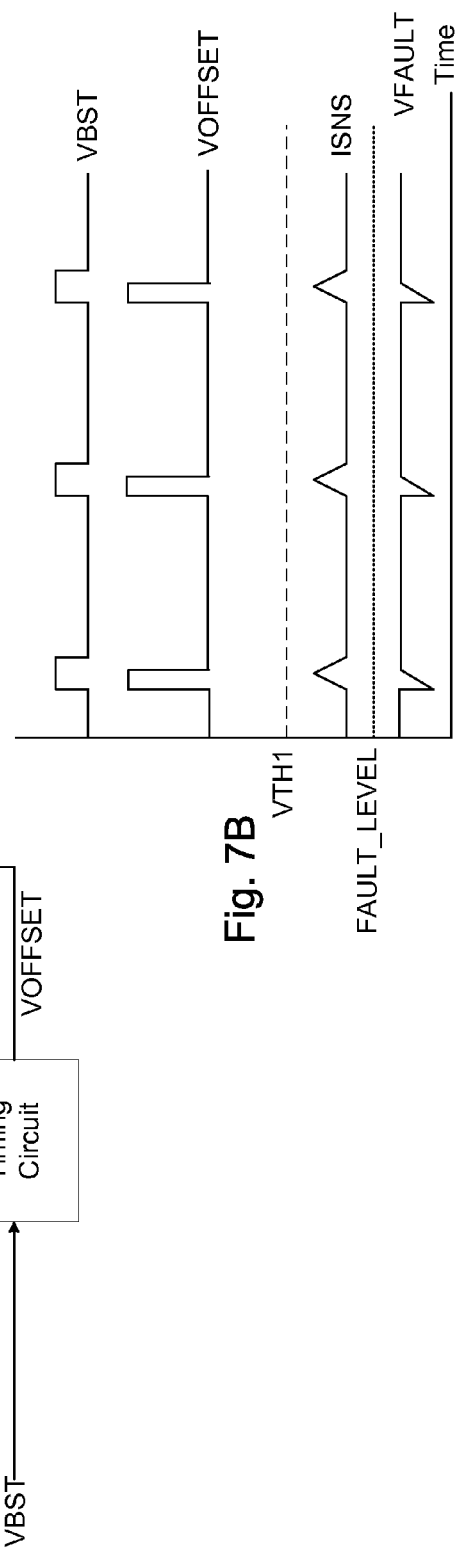
FIG. 7B illustrates a graph of certain signals of the system of FIG. 7A.

FIG. 7B illustrates a graph of certain signals of the embodiment of FIG. 7A, in which the x-axis represents a common time axis and the y-axis represents voltages in arbitrary units. Signals VBST, VOFFSET, ISNS and VFAULT are illustrated as well as reference level VTH1 and FAULT_LEVEL. As described above, in order to avoid transient response, protection trigger circuit 130 requires the error signal to be valid for a plurality of burst cycles, until fault signal VFAULT rises to fault level FAULT_LEVEL, and only then protection trigger circuit 130 is operative to shut down the operation of the inverter. Before the enablement of burst dimming pulse VBST, fault signal VFAULT is below fault level FAULT_LEVEL. At the rising edge of burst dimming pulse VBST, when lamp current feedback signal ISNS is below open lamp detection threshold VTH1 due to the ramping burst signal, pre-offset signal VOFFSET is activated thereby lowering fault signal VFAULT by a predetermined offset. Fault signal VFAULT begins to rise for each cycle where lamp current feedback signal ISNS is below open lamp detection threshold VTH1. In the event of a long burst dimming cycle (not shown) ISNS would rise above VTH1, thereby clearing VFAULT, as described above in relation to FIG. 1. For short burst cycles, the offset provided by VOFFSET prevents false triggering of protection trigger circuit 130.

FIG. 8A illustrates a high level block diagram of a system comprising an open lamp detection from lamp voltage functionality 100, an open lamp detection from lamp current functionality 110, a fault timing circuit 120, a protection trigger circuit 130, a lamp voltage feedback signal VSNS, a lamp current feedback signal ISNS, an open lamp detection threshold current level VTH1, a burst dimming pulse VBST, and a disable circuit 200 comprising a timing circuit 210, an electronically controlled switch 220, and a resistor 230. Fault timing circuit 120 is comprised of an analog capacitor charging circuit, or a digital counting circuit as described above in relation to error cycle count functionality 70 of FIG. 1. Lamp voltage feedback signal VSNS is connected to the input of open lamp detection from lamp voltage functionality 100, and the output of open lamp detection from lamp voltage functionality 100 is connected to a first input of fault timing circuit 120. Lamp current feedback signal ISNS is connected to a first input of open lamp detection from lamp current functionality 110 and the output of open lamp detection from lamp current functionality 110 is connected to a second input of fault timing circuit 120. Protection trigger circuit 130 is connected to the output of fault timing circuit 120. Value detection circuit 210 is connected to receive burst dimming pulse VBST and to output a corresponding signal when VBST is less than a predetermined value, with the output of timing circuit 210 connected to the gate of electronically controlled switch 220. Open lamp detection threshold current level VTH1 is connected to a first end of resistor 230, and a second end of resistor 230 carrying a signal denoted VTH1' is connected to a second input of open lamp detection from lamp current functionality 110, and to the drain of electronically controlled switch 220. The source of electronically controlled switch 220 is connected to a common point, shown as ground.

Open lamp detection from lamp voltage functionality 100 is in one embodiment implemented as described above in relation to comparator 40 of FIG. 1. Open lamp detection from lamp current functionality 110 is in one embodiment implemented as described above in relation to comparator 50 of FIG. 1. Value detection circuitry 200 may be implemented as an analog or a digital circuit.

In operation, if one of open lamp detection from lamp voltage functionality 100 and open lamp detection from lamp current functionality 110 detects an open lamp, an error signal is sent to fault timing circuit 120. If the error signal is sustained for a specific amount of time an open lamp is detected, as described above in relation to FIG. 1 and FIG. 2, and protection trigger circuit 130 is operative to shut down the inverter. As described above, in order to avoid transient response, typically fault timing circuit 120 requires the error signal to be valid for a plurality of burst cycles and only then outputs fault signal VFAULT to protection trigger circuit 130 thereby shutting down the operation of the lamp, in one embodiment by outputting the FAULT signal of FIG. 1.

Burst dimming pulse VBST is received at timing circuit 210. At the rise of burst dimming pulse VBST, timing circuit 210 closes electronically controlled switch 220 for a number of cycles which acts to pull down VTH1' to a low level, such as ground, and preferably maintain VTH1'. Since there is only a short period, normally less than 10 lamp frequency cycles, at the rising edge of burst dimming pulse VBST that a false open lamp would be seen from the lamp current feedback, open lamp detection from lamp current feedback can be disabled by timing circuit 210 by pulling down signal VTH1' received by open lamp detection from lamp current functionality 110 for a short period and allowing open lamp detection from lamp current functionality 110 to receive VTH thereafter. Open lamp detection is normally disabled during the entire burst off period including the falling edge of the burst on period, therefore disabling of the open lamp detection is only necessary during the rise of burst dimming pulse VBST.

Figure 8C:
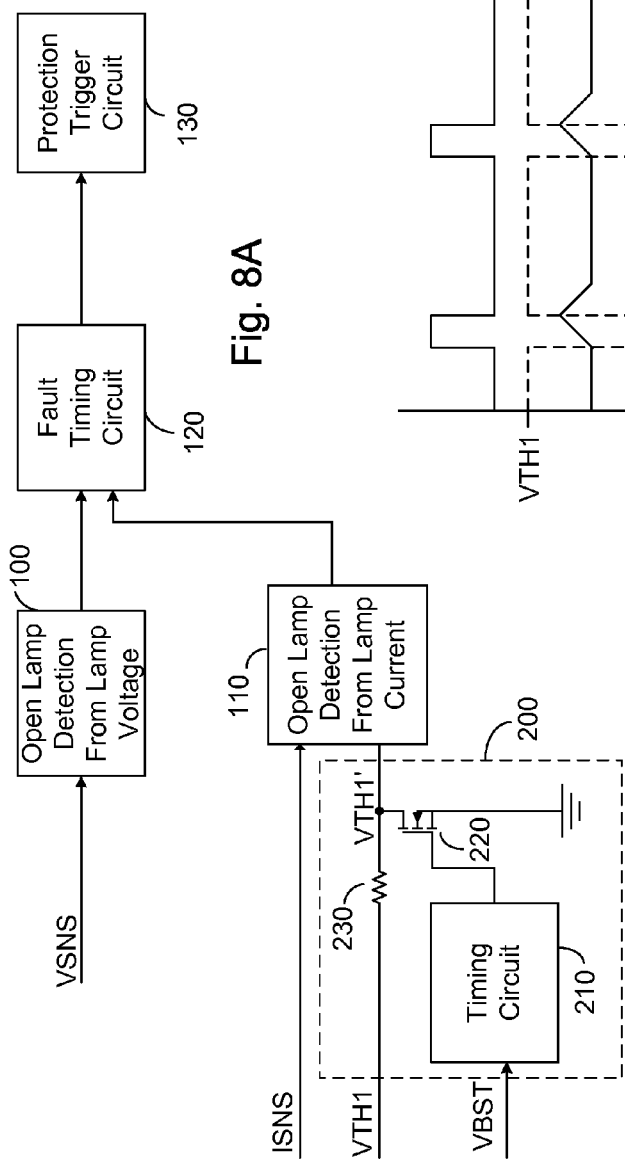
FIG. 8C illustrates a graph of certain signals of the system of FIG. 8A.
Figure 8C:
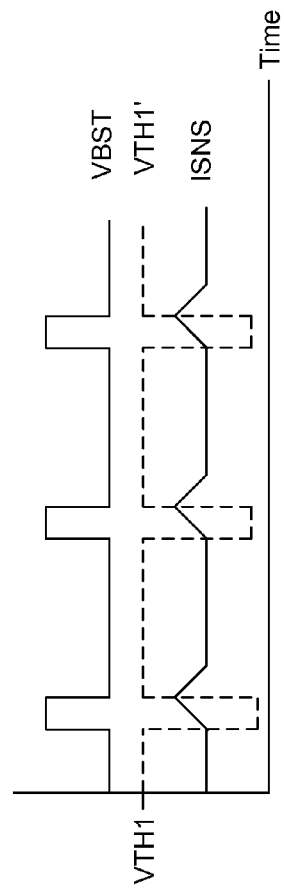
Figure 8D:
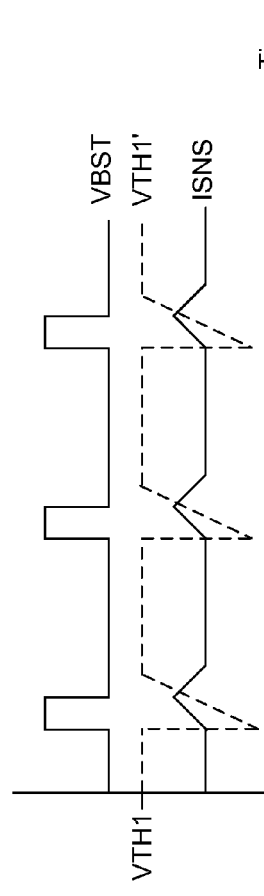
FIG. 8D illustrates a graph of certain signals of the system of FIG. 8B.
Figure 8B:
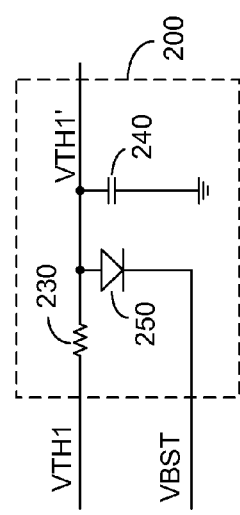
FIG. 8B illustrates a high level schematic diagram of a disable circuit providing a sloped rise for the effective open lamp detection threshold current level being compared with the sensed lamp current.

In another embodiment, as illustrated in FIG. 8B, disable circuit 200 comprises resistor 230, a capacitor 240 and a unidirectional circuit 250. Open lamp detection threshold current level VTH1 is connected to a first end of resistor 230, and a second end of resistor 230 carrying a signal denoted VTH1' is connected to a second input of open lamp detection from lamp current functionality 110, to a first end of capacitor 240 and to the anode of unidirectional circuit 250. The second end of capacitor 240 is connected to a common point of low value, illustrated as ground. The cathode of unidirectional circuit 250 is connected to burst dimming pulse VBST. Preferably, values for resistor 230 and capacitor 240 are selected so that at the rising edge of VBST, VTH1' rises slower than ISNS, and remains lower than ISNS until ISNS reaches its steady state value. Thus, when VBST goes low, VTH1' is pulled down, and upon the rising edge of all burst dimming cycles, VTH1' is sloped by the charging of capacitor 240 through resistor 230. As described above in relation to FIG. 1 an open lamp is detected when lamp current feedback signal ISNS is below the open lamp detection threshold current level, in the present embodiment VTH1'. As VTH1' was pulled down, ISNS will be greater than VTH1' thereby avoiding a false open lamp detection. Open lamp detection is normally disabled during the entire burst off period including the falling edge of the burst on period, therefore disabling of the open lamp detection is only necessary during the rise of burst dimming pulse VBST.

FIG. 8C illustrates a graph of certain signals of the embodiment of FIG. 8A, in which the x-axis represents a common time axis and the y-axis represents voltages in arbitrary units. Signals VBST, VTH1' and ISNS are illustrated as well as reference level VTH1. At each rising edge of burst dimming pulse VBST, optionally only when the burst of VBST is less than a predetermined value, the value of VTH1' is pulled down to a low level, optionally to ground, thereby being less than the expected value of ISNS. The low level is maintained for a sufficient amount of time for ISNS to rise to its steady state value. As a result no error is detected for low burst dimming cycles.

FIG. 8D illustrates a graph of certain signals of the embodiment of FIG. 8A, in which the x-axis represents a common time axis and the y-axis represents voltages in arbitrary units. Signals VBST, VTH1' and ISNS are illustrated as well as reference level VTH1. At each burst of VBST, the value of VTH1' is pulled down to a low level, optionally to ground, and VTH1' rises slowly after being pulled down, consistently being less than the expected value of ISNS caused by the sloped burst dimming cycle rising edge. As a result no error is detected for low burst dimming cycles.

Figure 9:
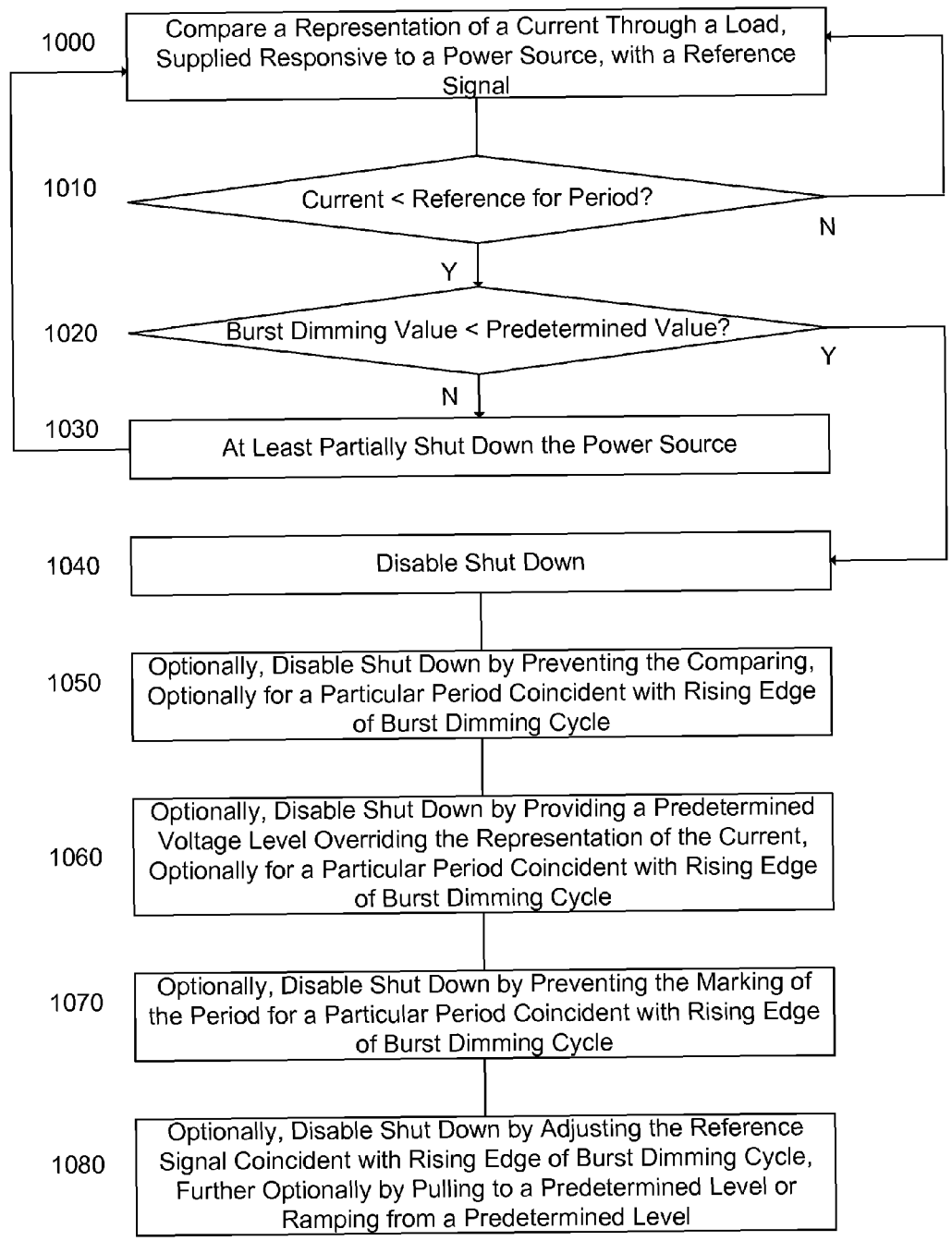
FIG. 9 is a high level flow chart of the method of operation of each of FIGS. 3-8B.

FIG. 9 is a high level flow chart of the method of operation of each of the embodiments of FIG. 3-8B. In stage 1000, a representation of a current through a load, such as ISNS, supplied responsive to a power source, is compared with a reference value, such as VTH1. In stage 1010, in the event that the compared representation of the current of stage 1000 is not less than the reference for a predetermined period, described above as a predetermined number of cycles of the power source, stage 1000 is repeated.

In the event that in stage 1010 the compared representation of the current of stage 1000 is less than the reference for the predetermined period, in stage 1020 the burst dimming value is compared with a predetermined minimum burst value. The predetermined minimum burst value is selected in cooperation with the burst dimming slope so that a false open error is not triggered. In the event that the burst dimming value is not less than the predetermined minimum burst value, i.e. an open lamp condition has been detected, in stage 1030 the power source is at least partially shut down and stage 1000, as described above, is performed.

In the event that in stage 1020 the burst dimming value is less than the predetermined minimum burst value, in stage 1040 the shut down of stage 1030 is disabled. In optional stage 1050, the disabling of stage 1040 is accomplished by preventing the comparing of stage 1000, optionally for a particular period coincident with the rising edge of the burst dimming cycle, as described above in relation to FIGS. 3, 5A and 5B.

In optional stage 1060, the disabling of stage 1040 is accomplished by providing a predetermined voltage level overriding the representation of the current, optionally for a particular period coincident with the rising edge of the burst dimming cycle, as described above in relation to FIGS. 4A, 4B, 6A, 6B.

In optional stage 1070, the disabling of stage 1040 is accomplished by preventing the marking of the period of stage 1010 being exceeded, optionally for a particular period coincident with the rising edge of the burst dimming cycle, as described above in relation to FIGS. 7A, 7B.

In optional stage 1080, the disabling of stage 1040 is accomplished by adjusting the reference signal of stage 1000 coincident with the rising edge of the burst dimming cycle, as described above in relation to FIGS. 8A-8D. Optionally, as described above in relation to FIGS. 8A-8D, adjusting the reference is signal is accomplished by one of pulling the reference signal to a predetermined value and ramping the reference signal from a predetermined value to its nominal value.

Thus the present embodiments enable burst dimming at low duty cycles without causing false open lamp detection. This is accomplished in one embodiment by disabling the open lamp current detection at low duty cycles, usually below 10%. In another embodiment the open lamp current detection is disabled completely during operation. In another embodiment the lamp current feedback signal is pulled up to a level above the open lamp detection threshold during the burst on period. In yet another embodiment lamp current detection is disabled for a number of cycles at the rise of burst dimming. Open lamp detection is normally disabled during the entire burst off period including the falling edge and therefore disabling of lamp current detection is needed only at the rising edge. In another embodiment the lamp current feedback signal is pulled up to a level above the open lamp detection threshold for a short period, the short period being equal or longer than the time to rise to the threshold, during the burst on edge.

In one more embodiment a pre-offset is provided to the open lamp timing circuit at the burst dimming rising edge to prevent false open lamp detection. As described above, in order to avoid transient response, typically the open lamp detection functionality requires the error signal to be valid for a plurality of burst cycles. The pre-offset provides a pre-determined discharge for the timing capacitor, or a pre-determined decrement of the timing counter, at the rising edge of burst dimming. The amount of pre-offset, i.e. the discharge timing capacitor or the decrement count of the fault timing counter, is set to be equal or slightly greater than the incremental timing effect caused by the open lamp detection at the rising edge of the burst on duty. In yet one more embodiment the open lamp detection threshold signal is ramped up to the nominal value over a predetermined number of cycle periods of the pulse generator coincident with the rising edge of the burst dimming duty cycle.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

We claim:

1. A cold cathode fluorescent lamp controller comprising:
    a pulse generator exhibiting a cycle period;
    a burst dimming control input lead coupled to said pulse generator, said pulse generator responsive to a signal received on said burst dimming control input lead to set a burst dimming duty cycle;
    a comparator, arranged to:
        receive a signal indicative of a value of current through a load driven by said pulse generator, and
        compare said received signal to a reference signal;
    an error detection circuit operative to shut down said pulse generator responsive to an output of said comparator indicating that said received signal is less than said reference signal for a predetermined number of cycles of said pulse generator; and
    a disable circuit arranged to prevent, when said set burst dimming duty cycle is less than a predetermined value, said shut down of said pulse generator responsive to said output of said comparator indicating said received signal is less than said reference signal.

2. A cold cathode fluorescent lamp controller according to claim 1, wherein said disable circuit is arranged to disable said comparator when said set burst dimming duty cycle is less than said predetermined value.

3. A cold cathode fluorescent lamp controller according to claim 1, wherein said disable circuit is arranged to provide a predetermined voltage level overriding said received signal indicative of the value of current through the load when said set burst dimming duty cycle is less than said predetermined value.

4. A cold cathode fluorescent lamp controller according to claim 1, wherein said disable circuit is arranged to disable said comparator for a predetermined number of cycle periods of said pulse generator coincident with a rising edge of said burst dimming duty cycle.

5. A cold cathode fluorescent lamp controller according to claim 1, wherein said disable circuit is arranged to provide a predetermined voltage level overriding, for a predetermined number of cycle periods of said pulse generator coincident with the rising edge of said burst dimming duty cycle, said received signal indicative of the value of current through the load.

6. A cold cathode fluorescent lamp controller according to claim 1, wherein said disable circuit is operative to prevent said error detection circuit from counting said predetermined number of cycles of said pulse generator for a predetermined number of cycle periods of said pulse generator coincident with a rising edge of said burst dimming duty cycle.

7. A cold cathode fluorescent lamp controller according to claim 1, wherein said disable circuit is operative to ramp said reference signal for a predetermined number of cycle periods of said pulse generator coincident with a rising edge of said burst dimming duty cycle.

8. A cold cathode fluorescent lamp controller according to claim 1, wherein said disable circuit is operative to pull said reference signal to a predetermined level for a predetermined number of cycle periods of said pulse generator coincident with a rising edge of said burst dimming duty cycle.

9. A method of preventing shut down due to a ramping burst signal, the method comprising:
    comparing a representation of a current through a load with a reference signal, the current through the load supplied responsive to a power source, and in the event that said current through the load is less than said reference signal for a first predetermined period, at least partially shutting down the power source;
    detecting that a burst dimming duty cycle for the current through the load is less than a predetermined value; and
    disabling said at least partially shutting down of the power source, when said burst dimming duty cycle is less than said predetermined value.

10. A method according to claim 9, wherein said disabling comprises preventing said comparing.

11. A method according to claim 9, wherein said disabling comprises:
    providing a predetermined voltage level; and
    overriding said representation of the current through the load.

12. A method according to claim 9, wherein said disabling comprises preventing said comparing for a second predetermined period coincident with a rising edge of the burst dimming duty cycle.

13. A method according to claim 9, wherein said disabling comprises:
    providing a predetermined voltage level; and
    overriding said representation of the current through the load for a second predetermined period coincident with a rising edge of the burst dimming duty cycle.

14. A method according to claim 9, wherein said disabling comprises preventing the marking of the expiration of said first predetermined period, said marking prevention being for a second predetermined period coincident with a rising edge of the burst dimming duty cycle.

15. A method according to claim 9, wherein said disabling comprises adjusting said reference signal for a second predetermined period coincident with a rising edge of the burst dimming duty cycle.

16. A method according to claim 15, wherein said adjusting comprises pulling said reference signal to a predetermined level.

17. A method according to claim 15, wherein said adjusting comprises ramping said reference signal.

18. A cold cathode fluorescent lamp controller comprising:
    a pulse generator exhibiting a cycle period;
    a means for receiving a burst dimming control, said pulse generator responsive to a signal received on said means for receiving a burst dimming control to set a burst dimming duty cycle;
    a means for comparing arranged to:
        receive a signal indicative of a value of current through a load driven by said pulse generator, and
        compare said received signal to a reference signal;

a means for detecting error arranged to shut down said pulse generator responsive to an output of said means for comparing indicating that said received signal is less than said reference signal for a predetermined number of cycles of said pulse generator; and a means for disabling said means for comparing arranged to prevent, when said set burst dimming duty cycle is less than a predetermined value, said shut down of said pulse generator responsive to said output of said means for comparing indicating said received signal is less than said reference signal.

19. A cold cathode fluorescent lamp controller according to claim 18, wherein said means for disabling is arranged to disable said means for comparing when said set burst dimming duty cycle is less than said predetermined value.

20. A cold cathode fluorescent lamp controller according to claim 18, wherein said means for disabling is arranged to provide a predetermined voltage level overriding said received signal indicative of the value of current through the load when said set burst dimming duty cycle is less than said predetermined value.

* * * * *